United States Patent [19]
Igarashi et al.

[11] Patent Number: 5,966,505
[45] Date of Patent: Oct. 12, 1999

[54] IMAGE OUTPUTTING METHOD AND CONVERTING INFORMATION PRODUCING METHOD

[75] Inventors: Takashi Igarashi; Yutaka Takei, both of Hino, Japan

[73] Assignee: Konica Corporation, Tokyo, Japan

[21] Appl. No.: 08/872,696

[22] Filed: Jun. 11, 1997

[30] Foreign Application Priority Data

Jun. 17, 1996 [JP] Japan .................................. 8-155355

[51] Int. Cl.$^6$ ........................... G06K 15/12; H04N 1/50; H04N 1/56
[52] U.S. Cl. ......................... 395/109; 395/504; 395/521; 395/302
[58] Field of Search ............................ 395/109; 358/504, 358/521, 406, 455, 302, 527, 501; 356/443; 355/35, 38

[56] References Cited

U.S. PATENT DOCUMENTS

| | | | |
|---|---|---|---|
| 4,809,198 | 2/1989 | Terashita | 355/35 |
| 4,956,718 | 9/1990 | Numakura et al. | 358/298 |
| 5,371,616 | 12/1994 | Numakura et al. | 358/501 |
| 5,664,252 | 9/1997 | Berg et al. | 356/443 |

*Primary Examiner*—Scott Rogers
*Attorney, Agent, or Firm*—Frishauf, Holtz, Goodman, Langer & Chick, P.C.

[57] ABSTRACT

In a method of producing converting data, a first characteristic curve showing relationship between density value and exposure amount is obtained by forming images on a first photographic material with plural different amounts of exposure and by measuring density values of the formed images. Digital exposure amount data is determined so as to represent the exposure amount of the first characteristic curve. The first characteristic curve is modified so as to show relationship between the density value and the digital exposure amount data by changing the exposure amount to the digital exposure amount data. A second characteristic curve showing relationship between density value and digital input value for exposing means is obtaiend by forming images on a second photographic material by the exposure means based on plural different digital input values and by measuring density values of the formed images. Then, converting data to convert the digital exposure amount data into the digital input value are obtained based on the first characteristic curve and the second characteristic curve.

15 Claims, 12 Drawing Sheets

IMAGE OUTPUTTING METHOD AND CONVERTING INFORMATION PRODUCING METHOD

BACKGROUND OF THE INVENTION

The present invention relates to an image outputting method, a digital exposure amount image information calculating method, a converting information producing method, a converting information recording medium, and an image outputting system.

At the outset, the digital exposure used hereinafter means that an image exposure is conducted based on digital image signals so as to form an image. The digital exposure is not limited by a specific exposing means. That is, as an exposure means for the digital exposure, a scanning exposure means with a laser beam, a one dimensional exposure means with a single array light source in which plural light emitting elements such as LEDs are aligned in a line, a two dimensional exposure means with plural array light sources, a projecting exposure means with a CRT screen and so on may be used.

Conventional technique 1.

Conventionally, in order to output an image by an image outputting means in which an image is outputted by digital exposure for a photosensitive material on the basis of digital image information expressed in an arbitrary color space system, the following method is generally used. Relationship between an original image information expressed in an arbitrary color space system and a obtained final image are obtained. Further, relationship between input value for the image outputting means and the obtained final image is obtained. Converting information to convert the original image information into input values for the image outputting means is obtained from the relationship between the original digital image information and the obtained final image and the relationship between the input values for the image outputting means and the obtained final image. The digital image exposure is conducted for the photosensitive material by obtaining the input values for the image outputting means from the digital image information expressed in an arbitrary color space system on the basis of the obtained converting information, thereby outputting the image by the image outputting means.

Conventional technique 2.

In the case of obtaining a great number of color prints from B, G, R digital image information, a color negative film is formed with sublimation type pigment image by using a sublimation type thermal transfer printer, a color image is exposed and printed from the color negative film onto a color printing photosensitive material, thereby obtaining the color prints.

Conventional technique 3.

Further, in the case of obtaining a great number of color prints from B, G, R digital image information, a silver halide color negative photographic film used for photographing is subjected to digital exposure on the basis of B,G,R digital image information and a color negative film is obtained by developing the exposed silver halide color negative photographic film. Then, a color image is exposed and printed from the color negative film onto a color printing photosensitive material, thereby obtaining the color prints.

Conventional technique 4.

This technique is similar to Conventional technique 3. That is, in conventional technique 5, a silver halide color negative photographic film used for photographing is subjected to digital exposure on the basis of digital image information and a color negative film is obtained by developing the exposed silver halide color negative photographic film. Then, a color image is exposed and printed from the color negative film onto a color printing photosensitive material, thereby obtaining the color prints. It may be consider for an ordinary person in view of this technique to record an image by utilizing all recordable density region of the negative film. However, how to use the density region is not clear.

Conventional technique 5.

This technique is also similar to Conventional technique 3. That is, in conventional technique 5, a silver halide color negative photographic film used for photographing is subjected to digital exposure on the basis of digital image information and a color negative film is obtained by developing the exposed silver halide color negative photographic film. Then, a color image is exposed and printed from the color negative film onto a color printing photosensitive material, thereby obtaining the color prints. In the case that a synthesized image of a pattern image and a photographic image is formed on a silver halide negative photographic film by digital exposure on the basis of pattern image information and digital photographic image information, it may be difficult for an ordinary person in view of this technique to consider to separate the density range of the pattern image from the density range of the photographic image.

In Conventional technique 1, it is necessary to obtain relationship between the original digital image and the obtained final image. Since color reproducibility of the entire system has to be obtained, it may be difficult to obtain the relationship correctly. As a result, only improper converting information from which proper output image may not be obtained has been obtained. Further, even if proper converting information is obtained, when fluctuation in the exposure level of the digital exposure of the image outputting means, fluctuation in the developing level or deviation in the characteristics among lot of the photosensitive materials takes place, it is necessary to obtain all over again the relationship between the original digital image information and the obtained final image and the relationship between the input values for the image outputting means and the obtained final image. Such a work requires much labor. Since the fluctuation in the exposure level of the digital exposure of the image outputting means, the fluctuation in the developing level or the deviation in the characteristics among lot of the photosensitive materials often takes place, and since many measuring operations and skillful technique are required for obtaining the relationship between the original digital image information and the obtained final image and the relationship between the input values for the image outputting means and the obtained final image, many customers have outputted image by using the converting information used hitherto without obtaining all over again the relationship between the original digital image information and the obtained final image and the relationship between the input values for the image outputting means and the obtained final image. As a result, in many cases, high quality image output could not be obtained.

The first objective of the present invention is to make it easy to deal with the fluctuation in the exposure level of the digit al exposure of the image outputting means, the fluctuation in the developing level or the deviation in the characteristics among lot of the photosensitive materials.

In Convention al technique 2, since a color negative film is formed with sublimation type pigment image by using a sublimation type thermal transfer printer, the producing efficiency is low. Further, it may be difficult with the current technique to form a color negative film with high resolution. Still further, since a relative large size color negative film is produced and an image is exposed and printed from the obtained relatively large size color negative film onto a color printing photosensitive material so as to obtain color prints, a large size printing exposure section is needed.

From the problems in Conventional technique 2, the technique of Conventional technique 3 may come to attention. However, the following problems may be pointed out for the silver halide photographic color negative film. It may be necessary to subtract the influence of sub-absorption of color dies constituting an image on the silver halide photographic color negative film. There may be deviation between an actual image seen from an object by eyes and a memory image of the object or deviation between an actual color of the object and memory color. Developing effect among photosensitive layers generally takes place due to the reason that peoples usually like prints reproduced brightly.

The developing effect among photosensitive layers is an effect to refrain another primary color from coloring for exposure to color a specific primary color.

In some cases, the similar correction to the developing effect among photosensitive layers has been already applied to B.G.R digital image information. Therefore, in the step of producing a color negative film, if the developing effect among photosensitive layers is further applied, the developing effect among photosensitive layers becomes strong excessively. As a result, chrome is so overemphasized that abnormal color prints color differently from original color are produced.

The second objective of the present invention is to correct the influence of the developing effect among photosensitive layers so as to prevent chroma from being overemphasized due to the developing effect among photosensitive layers so that abnormal prints may be avoided and color prints with a natural feeling can be obtained.

With an ordinary conception in view of Conventional technique 4, if an image is recorded by using all density region recordable on a silver halide color negative photographic film, since flare may take place as a special problem of digital exposure on an ordinary apparatus manufactured at reasonable cost, a range capable of controlling exposure intensity very well is narrow. As a result, it may be difficult to record a density in the vicinity of the maximum density in the density region capable of being recorded on the silver halide color negative photographic film. If conducting such a recording, flare is apt to take place. Further, with the density in the vicinity of the minimum density of the density region capable of being recorded on the silver halide color negative photographic film, the characteristic becomes unstable.

The third objective of the present invention is to avoid the special problems of the digital exposure so as to make it easy to obtain good prints.

With an ordinary conception in view of Conventional technique 5, if a synthesized image is subjected to digital exposure, since flare may take place as a special problem of digital exposure on an ordinary apparatus manufactured at reasonable cost, it may be difficult to control the light amount delicately. The digital exposure fluctuates delicately due to flare, a pattern image my not be formed in a sharp image.

The fourth objective is to make it possible by avoiding the special problem of the digital exposure to obtain a print on which a pattern image is formed in a sharp image capable of being discriminated from a photographic image even if a synthesized image of the pattern image and the photographic image is printed.

SUMMARY OF THE INVENTION

The above objectives of the present invention are attained by the following items.

Item 1. In an image outputting method of outputting an image by conducting digital exposure onto a photosensitive material by image outputting means to output an image in accordance with digital input image information for digital image information expressed in an arbitrary color space system, the image outputting method is characterized in steps of obtaining digital exposure amount image information provided to a photosensitive material from the digital image information;

obtaining digital input value image information for the image outputting means from the obtained digital exposure amount image information;

inputting the obtained digital input value image information to the image outputting means so as to conduct digital exposure onto the photosensitive material so that an image is outputted.

According to Item 1, by obtaining the digital exposure amount image information provided to a photosensitive material from the digital image information expressed in the arbitrary color space system, a predetermined conversion which is not changed by the fluctuation in the exposure level of the digital exposure of the image outputting means, the fluctuation in the developing level or the deviation in the characteristics among lot of the photosensitive materials can be obtained. By converting the digital exposure amount image information provided to a photosensitive material into the digital input value image information for the image outputting means, the fluctuation in the exposure level of the digital exposure of the image outputting means, the fluctuation in the developing level and the deviation in the characteristics among lot of the photosensitive materials can be replaced with fluctuation in the digital exposure amount provided to the photosensitive material. Accordingly, since the conversion which is easily adjusted for the fluctuation in the exposure level of the digital exposure of the image outputting means, the fluctuation in the developing level and the deviation in the characteristics among lot of the photosensitive materials can be obtained, proper converting information can be obtained easily, and it makes it easy to deal with the fluctuation in the exposure level of the digital exposure of the image outputting means, the fluctuation in the developing level and the deviation in the characteristics among lot of the photosensitive materials.

Item 2. The image outputting method described in Item 1 is characterized in steps of obtaining digital density image information which is density information of the developed image on the photosensitive material from the digital image information, and obtaining the digital exposure amount image information provided to the photosensitive material from the obtained digital density image information.

According to Item 2, the digital density image information which is density information of the developed image on the photosensitive material can obtained from the digital image information with a one to one correspondence basis conversion. Also, the digital exposure amount image information provided to the photosensitive material can be obtained from the obtained digital density image information with a one to one correspondence basis conversion likewise the sensitometry characteristics. Accordingly, the digital exposure amount image information can be obtained easily.

Item 3. The image outputting method described in Item 1 or 2 is characterized in that the photosensitive material is a printing photosensitive material, a hard copy of the color digital image information is obtained by obtaining a print by developing the printing photosensitive material subjected to the digital exposure.

According to Item 3, proper converting information can be obtained easily, and it makes it easy to deal with the fluctuation in the exposure level of the digital exposure of the image outputting means, the fluctuation in the developing level and the deviation in the characteristics among lot of the photosensitive materials.

Item 4. The image outputting method described in Item 1 is characterized in that the photosensitive material is a copying photosensitive material, a hard copy of the color digital image information is obtained by obtaining a print in such a manner that the copying photosensitive material subjected to the digital exposure is developed so as to obtain a copy original and the obtained copy original is exposed and printed on a printing photosensitive material so as to obtain the print, wherein printing exposure amount image information provided to the printing photosensitive material is obtained from the digital image information, and the obtained printing exposure amount image information is used as the digital density image information so as to obtain the digital exposure amount image information provided to the copying photosensitive material.

According to Item 4, even if a method does not obtain a print directly by the digital exposure and is the image outputting method in which the photosensitive material is a copying photosensitive material, a hard copy of the digital image information is obtained by obtaining a print in such a manner that the copying photosensitive material subjected to the digital exposure is developed so as to obtain a copy original and the obtained copy original is exposed and printed on a printing photosensitive material so as to obtain the print, proper converting information can be obtained easily, and it makes it easy to deal with the fluctuation in the exposure level of the digital exposure of the image outputting means, the fluctuation in the developing level and the deviation in the characteristics among lot of the photosensitive materials.

Item 5. In a digital exposure amount image information calculating method of calculating a digital exposure amount image information from a digital image information expressed in an arbitrary color space system, the digital exposure amount image information corresponding to the digital image information and provided to a photosensitive material, the digital exposure amount image information calculating method is characterized in steps of obtaining digital density image information which is density information of a developed image on the photosensitive material from the digital image information; and obtaining digital exposure amount image information provided to the photosensitive material from the obtained digital density image information.

According to Item 5, the digital density image information which is density information of the developed image on the photosensitive material can obtained from the digital image information with a one to one correspondence basis conversion.

Also, the digital exposure amount image information provided to the photosensitive material can be obtained from the obtained digital density image information with a one to one correspondence basis conversion likewise the sensitometry characteristics.

Item 6. In a converting information producing method of producing converting information to convert the digital exposure amount information provided to the photosensitive material into digital input values for an image outputting means for outputting an image by conducting digital exposure onto the photosensitive material in accordance with the digital input image information, the converting information producing method is characterized in that the converting information is produced from a first information representing a relationship between the digital exposure amount information provided to the photosensitive material and the density information of the developed image on the photosensitive material produced by the digital exposure amount information and a second information representing a relationship between the digital input values for the image outputting means for outputting an image by conducting digital exposure onto the same photosensitive material as the photosensitive material in the time of obtaining the first information and the density information of the developed image on the photosensitive material produced by the digital input values.

According to Item 6, since first information representing the relationship between the digital exposure amount information provided to the photosensitive material and the density information of the developed image on the photosensitive material produced by the digital exposure amount information is constant, if the relationship is once obtained, only by obtaining the second information representing a relationship between the digital input values for the image outputting means and the density information of the developed image on the photosensitive material produced by the digital input values, the converting information to convert the exposure amount information provided to the photosensitive material into input values for an image outputting means for outputting an image by conducting digital exposure onto the photosensitive material. With this, it makes it easy to deal with the fluctuation in the exposure level of the digital exposure of the image outputting means, the fluctuation in the developing level and the deviation in the characteristics among lot of the photosensitive materials, and proper converting information can be obtained easily.

Item 7. The converting information producing method described in Item 6 is characterized in that the photosensitive material is a color photosensitive material comprising plural photosensitive layers each photosensitive to a different primary color.

According to Item 7, even if the photosensitive material is the color photosensitive material comprising plural photosensitive layers each photosensitive to a different primary color, it makes it easy to deal with the fluctuation in the exposure level of the digital exposure of the image outputting means, the fluctuation in the developing level and the deviation in the characteristics among lot of the photosensitive materials, and proper converting information can be obtained easily.

Item 8. The image outputting method described in either one of Items 1 to 4 is characterized in that the digital exposure amount image information is converted into the digital input value image information for the image outputting means on the basis of the converting information produced by the converting information producing method described in Item 6.

According to Item 8, it makes it easy to deal with the fluctuation in the exposure level of the digital exposure of the image outputting means, the fluctuation in the developing level and the deviation in the characteristics among lot of the photosensitive materials, and proper converting information can be obtained easily.

Item 9. The image outputting method described in either one of Items 1 to 4 is characterized in that the digital exposure amount image information is converted into the digital input value image information for the image outputting means on the basis of the converting information produced by the converting information producing method described in Item 7.

According to Item 9, it makes it easy to deal with the fluctuation in the exposure level of the digital exposure of the image outputting means, the fluctuation in the developing level and the deviation in the characteristics among lot of the photosensitive materials, and proper converting information can be obtained easily.

Item 10. The image outputting method described in either of Items 1 to 4 or Item 8 is characterized in that the photosensitive material is a color photosensitive material comprising plural photosensitive layers each photosensitive to a different primary color.

According to Item 10, even if the photosensitive material is the color photosensitive material comprising plural photosensitive layers each photosensitive to a different primary color, it makes it easy to deal with the fluctuation in the exposure level of the digital exposure of the image outputting means, the fluctuation in the developing level and the deviation in the characteristics among lot of the photosensitive materials, and proper converting information can be obtained easily.

Item 11. The image outputting method is characterized in that in the image outputting method described in Item 10 in which the digital image information is color digital image information and the color photosensitive material is a color photosensitive material having a developing effect among photosensitive layers, the influence of the developing effect among photosensitive layers of the color photosensitive material is corrected from the color digital image information, and then the color photosensitive material is subjected to digital exposure.

According to Item 11, even if the color photosensitive material having the developing effect among photosensitive layers is used, by correcting the influence of the developing effect among photosensitive layers of the color photosensitive material, an event that chroma is overemphasized due to the developing effect among photosensitive layers and prints becomes abnormal color prints different from the original color can be avoided, and color prints with a natural feeling can be obtained.

Item 12. The image outputting method described in Item 11 is characterized in that the influence of the developing effect among photosensitive layers of the color photosensitive material is corrected from the color digital exposure amount image information obtained from the color digital image information and the digital input value for the image outputting means is obtained from the corrected color digital exposure amount image information.

According to Item 12, even if the color photosensitive material having the developing effect among photosensitive layers is used, by correcting the influence of the developing effect among photosensitive layers of the color photosensitive material, an event that chroma is overemphasized due to the developing effect among photosensitive layers and prints becomes abnormal color prints different from the original color can be avoided, and color prints with a natural feeling can be obtained.

In an image outputting method of obtaining a hard copy of a color digital image information by conducting digital exposure based on color digital image information onto a color photosensitive material which comprises plural photosensitive layers each sensitive with a different primary color and has a developing effect among photosensitive layers and by conducting a developing process for the color photosensitive material subjected to the digital exposure, the image outputting method is characterized in that the influence of the developing effect among photosensitive layers of the color photosensitive material is corrected from the color digital image information, and then the color photosensitive material is subjected to digital exposure.

According to Item 13, even if the color photosensitive material having the developing effect among photosensitive layers is used, by correcting the influence of the developing effect among photosensitive layers of the color photosensitive material, an event that chroma is overemphasized due to the developing effect among photosensitive layers and prints becomes abnormal color prints different from the original color can be avoided, and color prints with a natural feeling can be obtained.

Item 14. The image outputting method described in Item 13 is characterized in that the color digital image information is B,G,R digital image information, the color photosensitive material is a silver halide photographic color negative film comprising B,G,R photosensitive layers, a hard copy of the color digital image information is obtained by obtaining color negative film by conducting developing process for the silver halide photographic color negative film subjected to the digital exposure and by obtaining a color print by exposing and printing a printing color photographic material from the obtained color negative film.

According to Item 14, even if the silver halide photographic negative film comprising B,G,R photosensitive layers having usually a strong developing effect among photosensitive layers is used, by correcting the influence of the developing effect among photosensitive layers of the color photosensitive material, an event that chroma is overemphasized due to the developing effect among photosensitive layers and prints becomes abnormal color prints different from the original color can be avoided, and color prints with a natural feeling can be obtained.

Item 15. In a converting information producing method of producing correcting converting information for a developing effect among photosensitive layers to correct developing effect among photosensitive layers of color photosensitive material from color digital image information when conducting digital exposure on the basis of the color digital image information for the color photosensitive material which comprises plural photosensitive layers each sensitive a different primary color and has a developing effect among photosensitive layers, the converting information producing method is characterized in that the correcting converting information for a developing effect among photosensitive layers is produced from a first information representing for each primary color a relationship between digital exposure amount information provided onto the color photosensitive material by an exposure amount ratio among first primary colors and density information of developed image of the photosensitive material formed by the digital exposure amount information, and a second information representing a relationship between digital exposure amount information provided onto the color photosensitive material by an exposure amount ratio among second primary colors different from the exposure amount ratio among the first primary colors and density information of developed image of the photosensitive material formed by the digital exposure amount information.

According to Item 15, the correcting converting information for a developing effect among photosensitive layers can be produced easily even if a color photosensitive material which comprises plural photosensitive layers each sensitive a different primary color and has a developing effect among photosensitive layers is used. The influence of the developing effect among photosensitive layers of the color photosensitive material is corrected by the correcting converting information for the developing effect among photosensitive layers obtained from the B,G,R digital image information. By conducting digital exposure from the corrected color digital image information so that the influence of the developing effect among photosensitive layers of the color photosensitive material is corrected, an event that chroma is overemphasized due to the developing effect among photosensitive layers and prints becomes abnormal color prints different from the original color can be avoided, and color prints with a natural feeling can be obtained.

Item 16. The converting information producing method described in Item 15 is characterized in that the color digital image information is B,G,R digital image information and the color photosensitive material is a silver halide photographic color negative film comprising B,G,R photosensitive layers.

According to Item 16, even if the silver halide photographic negative film comprising B,G,R photosensitive layers having usually a strong developing effect among photosensitive layers is used, by correcting the influence of the developing effect among photosensitive layers of the color photosensitive material, an event that chroma is overemphasized due to the developing effect among photosensitive layers and prints becomes abnormal color prints different from the original color can be avoided, and color prints with a natural feeling can be obtained.

Item 17. The image outputting method described in Item 8 is characterized in that on the basis of the correcting converting information for a developing effect among photosensitive layers produced by the converting information producing method described Item 15 or 16 the influence of the developing effect among photosensitive layers of the color photosensitive material is corrected from the color digital image information, and then the color photosensitive material is subjected to digital exposure.

According to Item 17, even if the silver halide photographic negative film having usually a developing effect among photosensitive layers is used, by correcting the influence of the developing effect among photosensitive layers of the color photosensitive material, an event that chroma is overemphasized due to the developing effect among photosensitive layers and prints becomes abnormal color prints different from the original color can be avoided, and color prints with a natural feeling can be obtained.

Item 18. The image outputting method described in either one of Items 1 to 4, Items 8 to 14 and Item 17 is characterized in that the digital exposure is conducted to record on a part of the recordable density region for the color photosensitive material except at least the highest density region.

According to Item 18, the specific problem of the digital exposure that it may be difficult to record on the vicinity of the highest density region among the recordable density region of the silver halide color photographic negative film can avoided. Originally, since a density region of the negative film reproducible by the printing is a part of the density region recordable on the silver halide color photographic negative film, there is no image deterioration caused by recording the part of the recordable density region for the silver halide color photographic negative film except at least the highest density region and an excellent print can be obtained.

Item 19. In an image outputting method of obtaining a print by conducting digital exposure for a silver halide photographic negative film on the basis of digital image information, by developing the silver halide photographic negative film subjected to the digital exposure so as to obtain a negative film, and by exposing and printing the obtained negative film onto a printing photosensitive material, the image outputting method is characterized in that when the digital exposure is conducted on the silver halide photographic negative film on the basis of the digital image information, the digital exposure is conducted on from the lowest neutral density recordable on the silver halide color negative photographic film to the exposure region with exposure amount of $10^{2.0}$ to $10^{2.7}$.

According to Item 19, the digital exposure is conducted on a part of the recordable density region for the silver halide color photographic negative film except the high density region onto which it may be difficult to conduct the digital exposure, thereby avoiding the specific problem of digital exposure that the recording on the high density region may be difficult. Further, originally, a density region of the negative film reproducible by the printing is a part of the density region recordable on the silver halide color photographic negative film, accordingly, there is no image deterioration caused by recording the part of the recordable density region for the silver halide color photographic negative film except at least the highest density region and an excellent print can be obtained.

Further, it may be preferable to conduct digital exposure with a exposure amount more than the exposure amount forming the density of (0.05 (or in paritcular 0.2)+the lowest density in the recordable density region on the silver halide color photographic negative film).

Item 20. The image outputting method described in Item 19 is characterized in that the digital image information corresponding to the minimum digital exposure amount is recorded with the darkest density in the recordable density region on the silver halide color photographic negative film, and the digital image information corresponding to the maximum digital exposure amount is recorded with the lightest density in the recordable density region on the silver halide color photographic negative film.

According to Item 20, the digital image information can be easily converted and correction can be conducted automatically when the contrast of the original digital image information is too high or when the contrast of the original digital image information is too low.

Item 21. In an image outputting method of obtaining a print of a synthesized image of a pattern image and a photographic image by conducting digital exposure of the synthesized image of the pattern image and the photographic image for a photographic negative film on the basis of pattern image information of non-gradation image and digital photographic image information of continuous gradation image, by developing the photographic negative film subjected to the digital exposure so as to obtain a negative film, and by exposing and printing the obtained negative film onto a printing photosensitive material, the image outputting method is characterized in that when the synthesized image of the pattern image and the photographic image is subjected to the digital exposure onto the photographic negative film on the basis of the pattern image information and the digital photographic image information, the digital exposure is conducted in such a manner that the photographic image is recorded on a part of the recordable density region on the photographic negative film and the pattern image is recorded with a density apart from the density region recording the photographic image.

According to Item 21, since the pattern image of the non-gradation image is recorded with the density apart from the density region recording the photographic image, even if flare or slight fluctuation in exposure amount takes place during digital exposure, there is a recording density difference between the pattern image and the photographic image on the negative film. Accordingly, even if the synthesized image of the pattern image and the photographic image is printed, a print on which the pattern image is recorded as a sharp image distinguishable from the photographic image can be obtained.

Item 22. The image outputting method described in either one of Items 19 to 21 is characterized in that the digital exposure is conducted in a form of a surface exposure by using CRT.

According to Item 22, even if digital exposure is conducted by using CRT in which flare is specifically apt to take place and slight fluctuation in exposure amount is apt to take place, the specific problems of digital exposure can be avoided.

Item 23. In an image outputting system for outputting an image by conducting digital exposure onto a photosensitive material by image outputting means to output an image in accordance with digital image information expressed in an arbitrary color space system, the image outputting system is characterized by comprising color space converting means for obtaining digital exposure amount image information provided to a photosensitive material from the digital image information expressed in an arbitrary color space system;

output signal converting means for obtaining digital input value image information for the image outputting means from the digital exposure amount image information obtained by the color space converting means for the photosensitive material; and the image outputting means for being inputted with the digital input value image information converted by the output signal converting means and for outputting an image by conducting digital exposure for the digital exposure onto the photosensitive material.

According to Item 23, the same function and effect as those of Item 1 can be obtained.

Item 24. The image outputting system described in Item 23 is characterized in that the color space converting means comprises digital image density information calculating means to obtain digital density image information which is density information of the developed image on the photosensitive material from the digital image information, and digital exposure amount image information calculating means to obtain the digital exposure amount image information provided to the photosensitive material from the digital density image information obtained by the digital image density information calculating means.

According to Item 24, the same function and effect as those of Item 2 can be obtained.

Item 25. The image outputting system described in Item 23 is characterized in that the photosensitive material is a copying photosensitive material, the image outputting system comprises developing means for obtaining a copy original by conducting a development process for the copying photosensitive material subjected to the digital exposure; and printing means for obtaining a hard copy of the color digital image information by obtaining a print in such a manner that the obtained copy original by the developing means is exposed and printed on a printing photosensitive material, wherein the color space converting means comprises printing exposure amount image information calculating means to obtain printing exposure amount image information provided to the printing photosensitive material from the digital image information obtained; and digital exposure amount calculating means to obtain the digital exposure amount image information provided to the copying photosensitive material from the printing exposure amount image information obtained by the printing exposure amount calculating means.

According to Item 25, the same function and effect as those of Item 3 can be obtained.

Item 26. The image outputting system described in Item 24 is characterized in that the photosensitive material is a copying photosensitive material, the image outputting system comprises developing means for obtaining a copy original by conducting a development process for the copying photosensitive material subjected to the digital exposure; and printing means for obtaining a hard copy of the color digital image information by obtaining a print in such a manner that the obtained copy original by the developing means is exposed and printed on a printing photosensitive material, wherein the image outputting system comprises printing exposure amount image information calculating means to obtain printing exposure amount image information provided to the printing photosensitive material from the digital image information obtained; and digital exposure amount calculating means to obtain the digital exposure amount image information provided to the copying photosensitive material by using the printing exposure amount image information obtained by the printing exposure amount calculating means as the digital image density information.

According to Item 26, the same function and effect as those of Item 4 can be obtained.

Item 27. In a converting information memorizing medium for memorizing converting information to convert the digital exposure amount information provided to the photosensitive material into digital input values for an image outputting means for outputting an image by conducting digital exposure onto the photosensitive material, the converting information memorizing medium is characterized by memorizing the converting information produced from a first information representing a relationship between the digital exposure amount information provided to the photosensitive material and the density information of the developed image on the photosensitive material produced by the digital exposure amount information and a second information representing a relationship between the digital input values for the image outputting means for outputting an image by conducting digital exposure onto the same photosensitive material as the photosensitive material in the time of obtaining the first information and the density information of the developed image on the photosensitive material produced by the digital input values.

According to Item 27, by using the converting information memorized in the converting information memorizing medium, it makes it easy to deal with the fluctuation in the exposure level of the digital exposure of the image outputting means, the fluctuation in the developing level and the deviation in the characteristics among lot of the photosensitive materials, and proper converting information can be obtained easily.

Item 28. The image outputting system described in either one of Items 23 to 26 is characterized in that the output signal converting means converts the digital exposure amount image information provided to the photosensitive material into the digital input value image information for the image outputting means based on the converting information memorized in the converting information memorizing medium described in Item 27 to convert the digital exposure amount image information provided to the photosensitive material into the digital input value image information for the image outputting means.

According to Item 28, by using the converting information memorized in the converting information memorizing medium, it makes it easy to deal with the fluctuation in the exposure level of the digital exposure of the image outputting means, the fluctuation in the developing level and the deviation in the characteristics among lot of the photosensitive materials, and proper converting information can be obtained easily.

In an image outputting system for obtaining a hard copy of a color digital image information by conducting developing process for a color photosensitive material by a developing means, wherein the image outputting system comprises a digital exposure means for conducting digital exposure based on color digital image information onto a color photosensitive material which comprises plural photosensitive layers each sensitive with a different primary color and has a developing effect among photosensitive layers and the developing means for conducting a developing process for the color photosensitive material subjected to the digital exposure by the digital exposure means, the image outputting system is characterized in that the digital exposure means corrects the influence of the developing effect among photosensitive layers of the color photosensitive material from the color digital image information, and then conducts the digital exposure onto the color photosensitive material.

According to Item 29, the same function and effect as those of Item 15 can be obtained.

Item 30. The image outputting system described in Item 29 is characterized in that the color digital image information is B,G,R digital image information, the color photosensitive material is a silver halide photographic color negative film comprising B,G,R photosensitive layers, the developing means obtains color negative film by conducting developing process for the silver halide photographic color negative film subjected to the digital exposure and the image outputting system comprises printing means to obtain a hard copy of the color digital image information by obtaining a color print by exposing and printing a printing color photographic material from the obtained color negative film.

According to Item 14, even if the silver halide photographic negative film comprising B,G,R photosensitive layers having usually a strong developing effect among photosensitive layers is used, the same function and effect as those of Item 15 can be obtained.

Item 31. In a converting information memorizing medium for memorizing correcting converting information for a developing effect among photosensitive layers to correct developing effect among photosensitive layers of color photosensitive material from color digital image information when conducting digital exposure on the basis of the color digital image information for the color photosensitive material which comprises plural photosensitive layers each sensitive a different primary color and has a developing effect among photosensitive layers, the converting information memorizing medium is characterized by memorizing the correcting converting information for a developing effect among photosensitive layers produced from a first information representing for each primary color a relationship between digital exposure amount information provided onto the color photosensitive material by an exposure amount ratio among first primary colors and density information of developed image of the photosensitive material formed by the digital exposure amount information, and a second information representing a relationship between digital exposure amount information provided onto the color photosensitive material by an exposure amount ratio among second primary colors different from the exposure amount ratio among the first primary colors and density information of developed image of the photosensitive material formed by the digital exposure amount information.

According to Item 31, even if a color photosensitive material which has a developing effect among photosensitive layers is used, since developing effect among photosensitive layers can be corrected by using the correcting converting information for a developing effect among photosensitive layers memorized in the converting information memorizing medium, an event that chroma is overemphasized due to the developing effect among photosensitive layers and prints becomes abnormal color prints different from the original color can be avoided, and color prints with a natural feeling can be obtained.

Item 32. The image outputting system described in Item 30 is characterized in that the predetermined the correcting converting information for a developing effect among photosensitive layers is the memorized correcting converting information for a developing effect among photosensitive layers in the converting information memorizing medium described in Item 31.

According to Item 32, even if a color photosensitive material which has a developing effect among photosensitive layers is used, since developing effect among photosensitive layers can be corrected by using the correcting converting information for a developing effect among photosensitive layers memorized in the converting information memorizing medium, an event that chroma is overemphasized due to the developing effect among photosensitive layers and prints becomes abnormal color prints different from the original color can be avoided, and color prints with a natural feeling can be obtained.

Item 33. In an image outputting system for obtaining a print, wherein the image outputting system comprises a digital exposure means for conducting digital exposure for a silver halide photographic negative film on the basis of digital image information;

a developing means for developing the silver halide photographic negative film subjected to the digital exposure so as to obtain a negative film; and a printing means for exposing and printing the obtained negative film onto a printing photosensitive material, the image outputting system is characterized in that the digital exposure means conducted the digital exposure with a digital exposure amount up to an amount multiplied the digital exposure amount forming the density of (0.1+the lowest density in the recordable density region on the silver halide photographic negative film) with 1027.

According to Item 33, the same function and effect as those of Item 19 can be obtained.

Item 34. The image outputting system described in Item 33 is characterized in that the digital exposure means records the digital image information corresponding to the minimum digital exposure amount with the darkest density in the recordable density region on the silver halide color photographic negative film and records the digital image information corresponding to the maximum digital exposure amount with the lightest density in the recordable density region on the silver halide color photographic negative film.

According to Item 34, the same function and effect as those of Item 20 can be obtained.

Item 35. In an image outputting system comprising
- a digital exposure means for conducting digital exposure of the synthesized image of the pattern image and the photographic image for a photographic negative film on the basis of pattern image information of non-gradation image and digital photographic image information of continuous gradation image;
- a developing means for developing the photographic negative film subjected to the digital exposure so as to obtain a negative film; and
- a printing means for obtaining a print of a synthesized image of a pattern image and a photographic image and by exposing and printing the obtained negative film onto a printing photosensitive material, the image outputting system is characterized in that the digital exposure means conducted the digital exposure in such a manner that the photographic image is recorded on a part of the recordable density region on the photographic negative film and the pattern image is recorded with a density apart from the density region recording the photographic image.

According to Item 35, the same function and effect as those of Item 21 can be obtained.

Item 36. The image outputting system described in Item 35 is characterized further comprising
- a pattern image information forming means for forming the pattern image information;
- a digital photographic image information forming means provided separately from the pattern image information forming means and for forming the digital photographic image information;
- a synthesizing means for forming a digital synthesized image of the pattern image and the photographic image to conduct the digital exposure onto the negative film based on the pattern image information formed by the pattern image information forming means and the digital photographic image information formed by the digital photographic image information forming means,
- wherein the digital exposure means conducts the digital exposure for the digital synthesized image of the pattern image and the photographic image onto a negative photographic film.

According to Item 36, since the pattern image which needs large image pixel density and very small amount of color information and the digital photographic image which needs image pixel density smaller than the pattern image and very large amount of color information are formed separately from each other, each of them can be processed rapidly and a large memory capacity is not required. By conducting the synthesizing process later, the synthesized image can be obtained rapidly in comparison with the case that the synthesizing process is conducted initially. Accordingly, a stock amount of a synthesized image dose not become so large, that is, it is not necessary to use the large memory capacity. The obtained digital synthesized image can be outputted continuously.

Item 37. The image outputting system described in either one of Items 33 to 36 is characterized in that the digital exposure means conducts area exposure by using CRT.

According to Item 37, even if digital exposure is conducted by using CRT in which flare is specifically apt to take place and slight fluctuation in exposure amount is apt to take place, the specific problems of digital exposure can be avoided.

As digital image information expressed in an arbitrary color space system, monochromatic digital image information may be used or color digital image information composed of plural primary colors may be used. As the color digital image information used as the digital image information expressed in an arbitrary color space system, not only digital image information expressed in R,G,B color space system such as digital image information which is detected from original image by a scanner and is expressed in R,G,B density, digital image information which is detected from an object by photographing elements and is expressed in R,G,B density, and digital image information which is expressed in R,G,B input signals so as to be displayed on the monitor, but also digital image information expressed in CIELAB chromaticity coordinate, digital image information expressed in CIELUV chromaticity coordinate, and digital image information expressed in CIEXYZ chromaticity coordinate may be used.

As a photosensitive material, a photographing photosensitive material, a printing photosensitive material, a copying photosensitive material are listed from the view point of the use. Further, a silver halide photosensitive material and an electrophotographic photoreceptor are listed from the view point of the material. In the present invention, the silver halide photosensitive material may preferable in terms of sharpness, gradation and color reproducibility. Although the objective of the present invention is important for the silver halide photosensitive material to obtain high quality image, the objective can be attained by the present invention.

Incidentally, since there are the photographing photosensitive material and the copying photosensitive material as the photosensitive material in addition to the printing photosensitive material, an image obtained by developing the photosensitive material may be named as a developed image.

As the photographing photosensitive material, a photographing photosensitive film, a photographing photosensitive glass and a photographing photosensitive paper are listed. As the printing photosensitive material, a photographic paper and a printing film are listed.

As the image outputting means to output image by conducting digital exposure onto a photosensitive material, an apparatus which conducts exposure so as to output an image by relatively moving the photosensitive material against a line-shaped light emitting elements to emit light in accordance with digital image information, an apparatus which conducts close-contact-exposure for the photosensitive material with a plate-shaped light emitting elements to emit light in accordance with digital image information, an apparatus which conducts projecting exposure from a plate-shaped light emitting elements to emit light in accordance with digital image information to the photosensitive material so as to output an image, and an apparatus which scans on the photosensitive material with a light beam such as a laser to emit light in accordance with digital image information so as to output an image are listed.

As the apparatus which conducts projecting exposure from a plate-shaped light emitting elements to emit light in accordance with digital image information to the photosensitive material so as to output an image, an apparatus which conducts projecting exposure from CRT to emit light in accordance with digital image information to the photosensitive material so as to output an image and an apparatus which conducts projecting exposure from TFT elements to change cell density in accordance with digital image information to the photosensitive material so as to output an image are listed.

The digital exposure amount information is information to define a digital exposure amount. It may be the digital exposure amount itself, a logarithmic digital exposure amount (a logarithm of a digital exposure amount) or a relative value of a digital exposure amount. The digital exposure amount image information a digital image information expressed by the digital exposure amount information. The digital input value is an digital input value inputted to the image outputting means. The digital input value image information is a digital image information expressed by the digital input value inputted to the image outputting means. The image outputting means outputs an image in accordance with the digital input value image information. If the digital input value and the digital exposure amount provided to the photosensitive material by the image outputting means are entirely the same as each other, there may be no problem. However, they are not likely to be the same, and they are not even in a linear relationship.

The converting information to convert the digital exposure amount information to the digital input value for the image outputting means to output an image by conducting digital exposure onto the photosensitive material based on the digital input value image information, may be in all possible form. For example, information of matrix to approximately convert the digital exposure amount information to the digital input value for the image outputting means to output an image by conducting digital exposure onto the photosensitive material or data of three dimensional LUT to convert the digital exposure amount information to the digital input value for the image outputting means to output an image by conducting digital exposure onto the photosensitive material may be used as the converting information. Also, another form may be used as the converting information.

Density information is defined to be information which stipulates optical density, which may either be density itself or reflection ratio, transmissive ratio or light absorption ratio. In addition, density image information is defined to be digital image information represented by density information.

Information which shows relationship between digital exposure amount information given to a light-sensitive material and density information of developed image generated by the given digital exposure amount information may take any style. For example, information of function for each primary color for approximately converting the digital exposure amount information given to the light-sensitive material to density information of developed image generated by the given digital exposure amount information may be used. In addition, 3-D LUT data for converting exposure amount information given to the light-sensitive material to the density information of developed image generated by the given digital exposure amount information may be used. Other styles may be used.

Information which shows relationship between the digital input value to an image outputting means and density information of developed image generated by the given digital input value may take any style. For example, information of function for each primary color for approximately converting the digital input value to density information of developed image generated by the given digital input value. In addition, 3-D LUT data for converting the digital input value to an image outputting means density information of developed image generated by the given digital input value may be used. Other styles may be used.

In the present invention, the kind of light-sensitive material is defined to be kind in accordance with image property such as light-sensitive property and coloring property.

When a silver halide color negative photographic film is subjected to digital exposure based on B, G and R digital image information, B, G and R digital image information may be digital image information temporarily converted to B, G and R digital image information from color digital image information expressed by means of an arbitrary color space system such as digital image information expressed by means of a CIELAB chromaticity coordinate, digital image information expressed by means of a CIELUV chromaticity coordinate or digital image information expressed by means of a CIEXYZ chromaticity coordinate.

In a silver halide color negative photographic film for photographing use, one or plural silver halide emulsion light-sensitive layers for each primary color are provided on a film support. Most of aforesaid films for photographing contain developing effects among photosensitive layers due to reasons that: influence by the sub-absorption of a dye which constitutes the image of the silver halide color negative photographic film for photographing is subtracted; difference between an image of an object actually viewed and an image of an object memorized (difference of colors memorized and colors of actual object); ordinarily, a person likes prints vividly reproduced. On the contrary, in a silver halide color negative photographic paper for printing use, one or plural silver halide emulsion light-sensitive layer for each primary color are provided on a film support. In this case, the developing effects among photosensitive layers is only ignorable.

Information for correcting and converting developing effects among photosensitive layers is information for correcting influence from the developing effects among photosensitive layers of the silver halide color negative photographic film for photographing. Any type may be used. For example, information of function for each primary color for approximately converting B, G and R digital image information prior to correcting the influence from developing effects among photosensitive layers to B, G and R B, G and R digital image information after influence from the developing effects among photosensitive layers was corrected. In addition, 3-D LUT data for converting B, G and R digital image information prior to correcting the influence from developing effects among photosensitive layers to B, G and R B, G and R digital image information after influence from the developing effects among photosensitive layers was corrected. Other styles may be used.

As a device to digitally expose the silver halide light-sensitive color negative photographic film for photographing, a film recorder is conventional.

Sensitometry is defined to show correspondence between digital exposure amount information given to the light-sensitive material and density information of developed image obtained from a light-sensitive material exposed. Sensitometry property due to exposure on a silver halide color negative photographic film for photographing for plural of different colors is defined to be sensitometry property.

Neutral color is referred to as that the amount of B, G and R light is equal each other. B, G and R are three primary colors of light, B, G and R. Y, M and C are respectively light in which two of B, G and R are mixed in an equal amount and the remaining one color is mixed negligibly. Herein, neutral color is based on R, G, B density obtained by exposing achromtaic wedge exposure with CIE C, D50 or D65 light source and by developing. Neutral color relationship is referred to as that when B, G, R exposures which are usually conducted separately sequentially are conducted simultaneously, if the B, G, R exposures form neutral color, the B, G, R exposures are in the neutral color relationship.

A color negative photographic film may be a color negative photographic film made of other elements, in addition to a silver halide color negative photographic film.

Density area capable of being recorded on a silver halide color negative photographic film is a density area capable of being recorded on a color negative film obtained by photographically processing the silver halide color negative photographic film. Density area capable of being recorded on the silver halide color negative photographic film is different for each of B, G and R. Ordinarily, the lower limit is 0–1.0, and the upper limit is 1.8–3.5. However, these are not limited to the above-mentioned values. Density area of both ends capable of being recorded on a silver halide color negative photographic film are area referred to as "toe" and "shoulder" in which contrast is recorded low (soft). Toe portion has unfavorable graininess. However, in ordinary photographing and printing, the above-mentioned density area is utilized to be recorded.

Pattern image information is not necessarily digital pattern image information. It may be text-type character image information. In a synthetic image composed of a pattern image and a photographic image, the pattern image and the photographic image may be superposed, and may be separated. When a photographic image is synthesized with a pattern image, not only one sheet of photographic image, but also plural photographic images may be synthesized. In addition, not only one pattern image, plural pattern images may be synthesized. It goes without saying that the pattern image includes a picture image, symbol image and a mathematics symbol image.

When a pattern image is recorded at density distinct from the density area in which the photographic image is recorded, the pattern image may be recorded at density distinct from the density of the photographic image at an extent of discriminable. It is preferable that the distinction of density is, in conversion to logalism exposure amount, 0.02 or more (specifically, 0.05 or more) and 0.2 or less (specifically 0.1 or less).

As a method of color digital surface exposure by the use of the CRT. a method to successively expose in which color filters of each colors are successively located in front of a monochrome CRT and a method of exposing in which a color image is displayed on a color CRT are cited.

As a storing medium, recording media such a magnetic recording medium including a floppy disc and a magnetic tape, optical recording medium including CD-ROM and optical magnetic recording medium such MO and RAM chip and IC card in which batteries are backed up and ROM chip are cited. Among these storing media, a storing medium, an RAM backed up by a battery and uninvolatile storing medium are preferable since modification of setting is easy because separation and replacement are easy and re-write can be conducted and aforesaid medium can easily be supplied to plural printing systems. In addition, in the case of a system in which aforesaid storing medium is linked with a personal computer, memory may be stored in a storing device such as a hard disc on a personal computer. For such purposes, data may be transferred through a network. The memory may be stored in a part of computer connected to the network, and successively it may be transferred to the network. For example, conversion information produced and stored in America may successively be transferred to users in Japan.

Each conversion information may be obtained in an image outputting system by a customer. However, it is preferable to be produced accurately in advance in a factory or a marketing agent by the use of an image outputting system having identical properties as the image outputting system of the customer. It is also preferable that each of the resulting conversion information is passed through a communication circuit, or is stored in a portable storing medium or is integral in the image outputting system in advance to be supplied. Since it is possible promptly forward each of conversion information calculated in Australia or Canada to customers in Japan or England, it is preferable to supply it through a communication circuit such as a network. Conversion information forwarded through a communication circuit or stored in a storing medium can be stored/forwarded in such a manner that conversion information for each of light-sensitive material can be used as it is or coded to be forwarded.

DETAILED DESCRIPTION OF THE INVENTION

Hereinafter, an example of the present invention will be exhibited as an embodiment. However, the present invention is not limited thereto. In addition, the embodiment employs definitive expressions in terms of "terminology". However, they cite preferable examples. Therefore, the meaning or technological scope of the term of the present invention is not limited.

Embodiment 1

[Constitution of the apparatus]

An image outputting system of the present embodiment is a practical example of the present invention, in which, namely, color digital photographic image information which has been inputted from an inputting device such as a reflective original scanner and which is expressed in an arbitrary color space system is subjected to image processing. If necessary, aforesaid image outputting system of the present embodiment is subjected to image synthesis processing with pattern image information such as character image. Then, the signal of the digital input value is outputted to a film recorder, by which the signal is then subjected to digital exposure on a light-sensitive film for copying. The film for copying subjected to digital exposure is subjected to photographic processing. From the resulting film for copying, printing is obtained on a color photographic paper with a printer processor. Hereinafter, the apparatus of the present embodiment will be detailed.

Figure 1:
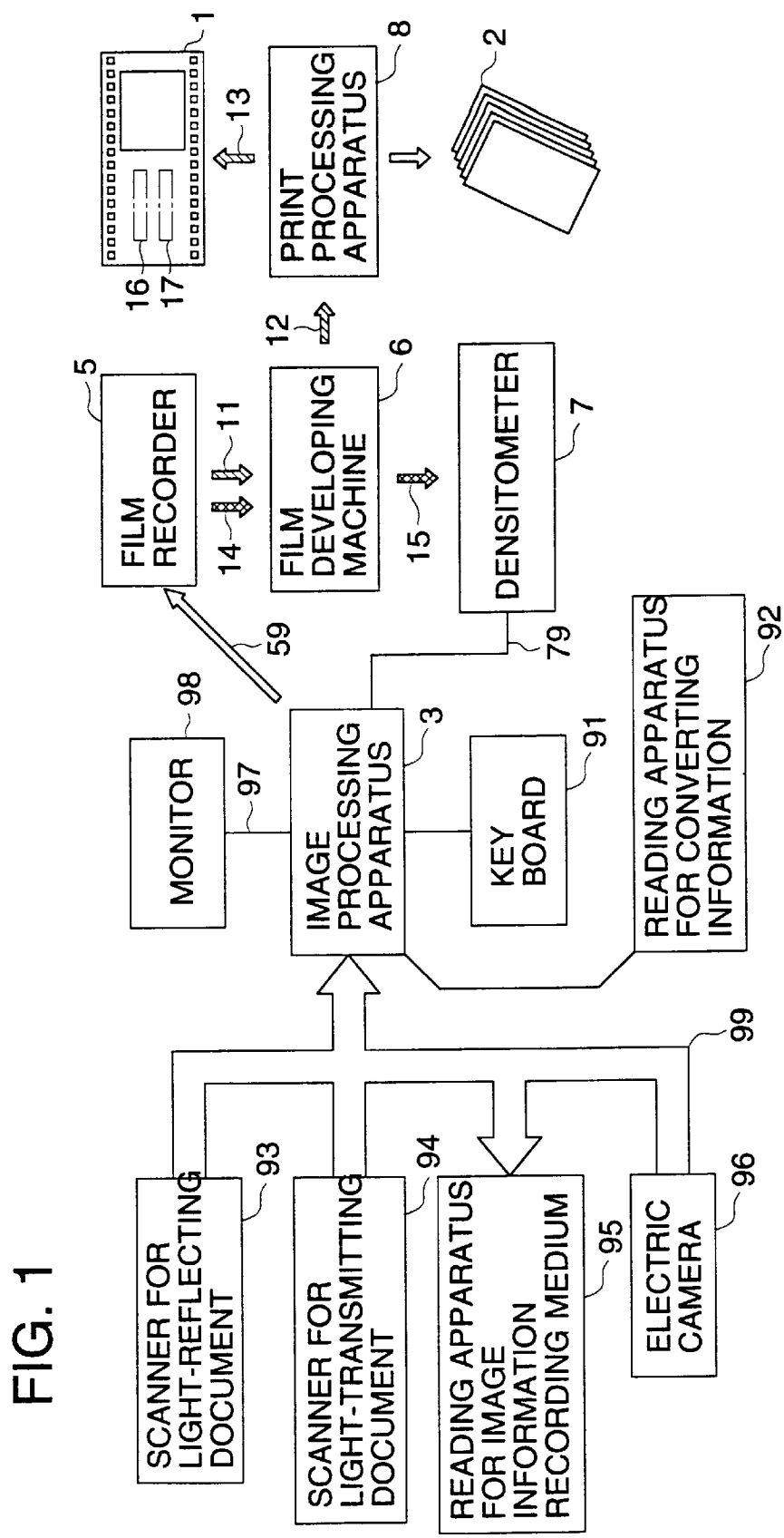
FIG. 1 shows a schematic block diagram of an image outputting system of Embodiment 1.

FIG. 1 shows a schematic block diagram of the present image outputting system. An image inputting device in the present image outputting system is composed of: reflection original scanner 93 which image-senses a reflection image on a reflection original and which obtains color digital photographic image information, transmission original scanner 94 which image-senses a transmission image on a transmission original and which obtains color digital photographic image information, image information recording media reading device 95 which obtains color digital photographic image information or pattern image information which is recorded onto color digital image information recording medium and electronic camera 96 which captures an image of an object and which converts it to color digital photographic image information. Aforesaid inputting device is connected to image processing device 3 by means of a SCSI-II, and send the resulting color digital image information to image processing device 3. In addition, though it is not illustrated, as a network which electrically transmits color digital photographic image information or pattern image information as an image inputting device, color digital photographic image information or pattern image information may be inputted into image processing device 3 through the network.

Incidentally, as a combination of image information recording medium reading device 95 and color digital image information recording medium, MO drive and MO, CD-ROM drive and Photo-CD, Picture-MD drive and Picture-MD and memory card reader and memory card are cited.

Image processing device 3 is connected to monitor 98 by means of monitor sending line 97, and is also connected to keyboard 91. It is also connected to converted information storing medium reading device 92, and also connected with densitometer 7 by means of density signal sending line 79. In addition, it is further connected to film recorder 5 by means of digital input value signal sending line 59. Based on converted information stored in the converted information storing medium read by converted information storing medium reading device 92, exposure amount image information is inputted into film recorder 5 through sending line 59 in accordance with operation of keyboard 91 while an image subjected to image processing is displayed onto monitor 98. Film recorder 5 converts digital exposure amount image information to digital input value image information and digitally exposes an image on a light-sensitive film for copying based on the resulting digital input value image information.

Light-sensitive film 11 which has been digitally exposed is subjected to photographic processing by means of film processing machine 6 to be film 12 for copying. Aforesaid film is set to a printing mask section of printer processor 8, and then, printed and exposed on a color photographic paper. Printer processor 8 subjects a color photographic paper to photographic processing printed and exposed from film 12 for copying to obtain print 2.

Film for copying 1 which has been printed and exposed in a printing and masking section is cut into lengths of 2 or more frames. These are recorded as at least one frame in a cut piece. In such a manner order information 16 and printing quantity information 17 are necessarily recorded on cut film for copying 1, film recorder 5 forms one frame of the latent image and all latent images for order information 16 and printing quantity information 17 on an area corresponding to ordinary 2 frames of light-sensitive film for copying.

[Image processing apparatus]

Figure 2:
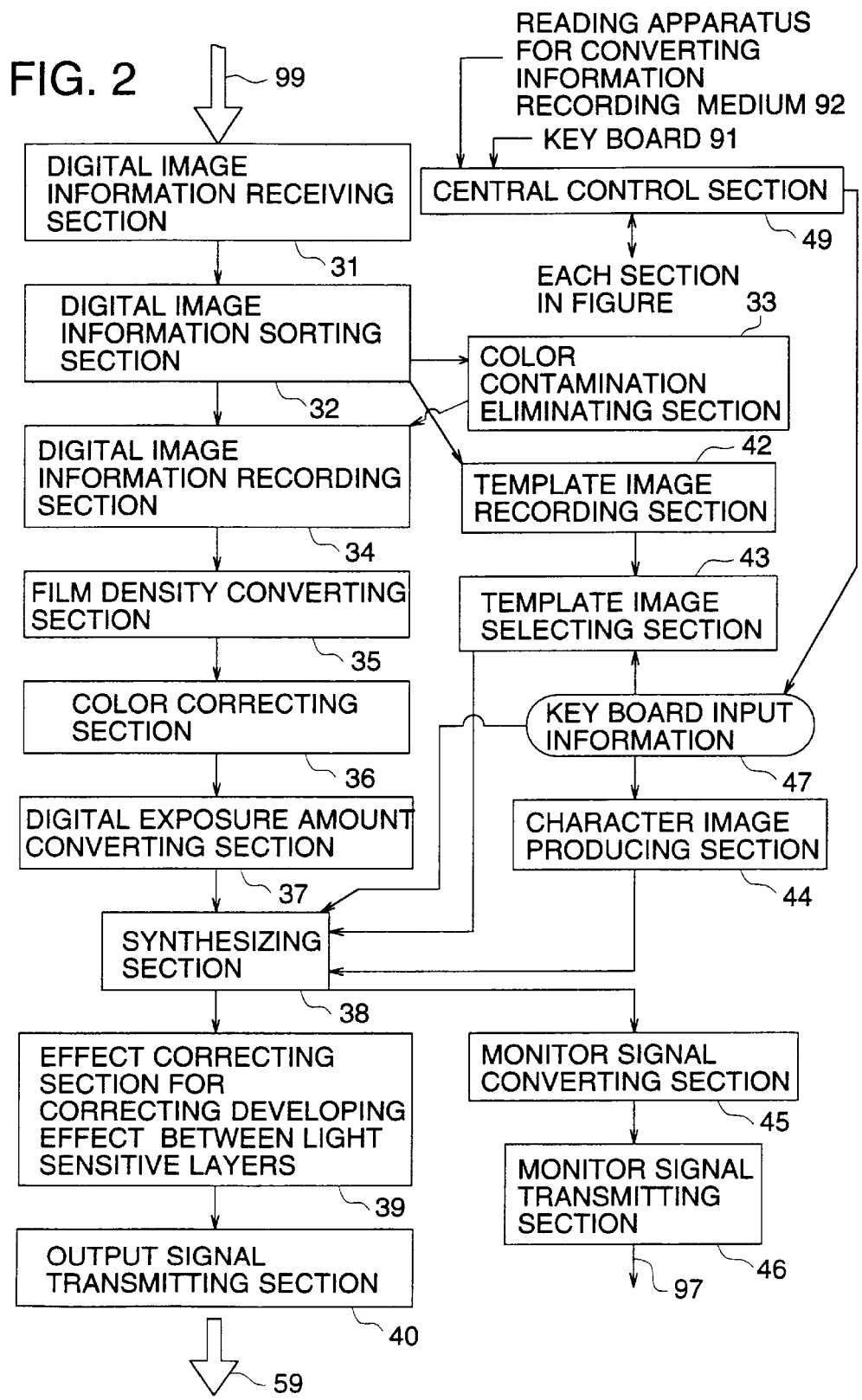
FIG. 2 shows a schematic block diagram of an image processing apparatus of an image outputting system of Embodiment 1.

Next, based on FIG. 2 which is a schematic block diagram of an image processing apparatus, image processing apparatus 3 will now be explained. Each section of image processing apparatus 3 is controlled by central control section 49. Keyboard 91 is connected to this central control section 49 in such a manner that information through key inputting from keyboard 91 is inputted. Central control section 49 sends converted information which has been stored in a converted information storing medium read by converted information storing medium reading device 92 to an appropriate section in accordance with the kind of converted information so that it controls in such a manner that each section converts information based on the updated conversion information.

Color digital image information inputted in image processing apparatus 3 is received by digital image information receiving section 31 and forwarded to digital image information assortment section 32.

Digital image information sorting section 32 sends received color digital image information to an appropriate section in accordance with the kind of received color digital image information. Namely, color digital photographic image information which has already been subjected to providing with appropriate color stain removal processing in an image inputting device side proceeds to digital image information storing section 34. On the contrary, color digital photographic image information which has already been subjected to providing an appropriate color stain removal processing on an image inputting device side and color digital photographic image information which has already been subjected to providing color stain removal processing at all are sent to color stain removal section 33. If the color digital image information is pattern image information such as a template image, aforesaid information is sent to template image storing section 42. Incidentally, "template image" is an image for design which may be reused.

Color stain removal section 33 removes color stains in the received color digital photographic image information and sends color digital photographic image information from which color stains are removed to digital image information storing section 34.

Digital image information storing section 34 stores received color digital photographic image information.

When a digital input value is completely sent to outputted signal sending section 40, it sends color digital image information for one frame stored to film density conversion section 35.

As digital image information storing section 34, in addition to RAM and a hard disc provided inside an image processing apparatus, an external hard disc provided outside the apparatus may auxiliarily be used.

Film density conversion section 35 converts the received color digital photographic image information to B, G and R film density photographic image information. Aforesaid B, G and R film density photographic image information is sent to color correction section 36. Incidentally, the film density photographic image information corresponds to print exposure amount photographic image information, and is approximately equal to the relative value of the exposure amount on a color photographic paper.

Here, depending upon the kind of color digital photographic image information, the following processing is conducted.

(1) In the case of color digital photographic image information in which a color negative film is image-sensed to be obtained, the received color digital photographic image information is converted, while density information remains as it is, to the B, G and R film density photographic image information.

(2) In the case of color digital photographic image information in which a color reversal film is image-sensed to be obtained, if the received color digital photographic image information is converted while density information remains as it is, hard-tone film density photographic image information in which the negative-positive relationship is reversed (a color negative film is considerably soft) results. Then, after aforesaid information is converted to B, G and R densities information, this information is subjected to g correction and negative-positive reversing by means of an LUT for B, G and R based on LUT data which is color reversal film conversion information to make B, G and R film density photographic image information. LUT data can be obtained from the characteristics curves of color reversal film and the characteristics curves of color negative film. That is, the LUT data can be obtained from the relationship between the density of images formed on these films by exposing these films with given exposure amount.

(3) In the case of color digital photographic image information in which a color reflection original is image-sensed to be obtained, if the received color digital photographic image information is converted to density information as it is, hard-tone film density photographic image information in which negative and positive are reversed is resulted in (the color negative film is considerably soft). After aforesaid information is converted to B, G and R densities information, this information is subjected to g correction and negative-positive reversing by means of an LUT for B, G and R based on LUT data which is color reversal film conversion information to make B, G and R film density photographic image information. LUT data can be obtained from the characteristics curves of a color printing paper in the case that the light reflection type original is the color printing paper. That is, the LUT data can be obtained from the relationship between the printing exposure amount and the density of formed images on the characteristics curves.

(4) In the case of color digital photographic image information of a computer graphic image aligned on a monitor display, if the received color digital photographic image information is converted to density information as it is, hard-tone film density photographic image information in which negative and positive are reversed is resulted in (the color negative film is considerably soft). After aforesaid information is converted to B, G and R densities information, this information is subjected to g correction and negative-positive reversing by means of an LUT for B, G and R based on LUT data which is color reversal film conversion information to make B, G and R film density photographic image information.

Color correction section 36 conducts color correction of the received film density photographic image information. Aforesaid film density photographic image information subjected to color correction is sent to digital exposure amount conversion section 37.

The received film density photographic image information is converted to digital exposure amount photographic image information based on the digital exposure amount conversion LUT for B, G and R formed based on the conversion LUT data of the digital exposure amount conversion information which is conversion information to convert B, G and R film density photographic image information to the digital exposure amount photographic image information. Namely, for B, G and R, based on the digital exposure amount conversion LUT, the film density photographic image information is converted to the digital exposure amount photographic image information. Incidentally, the LUT data of aforesaid digital exposure amount conversion LUT can be obtained from the characteristics curve of a light-sensitive material which is digitally exposed to light. Aforesaid digital exposure amount conversion LUT is read to be obtained what is stored in a conversion information storing medium as digital exposure amount conversion information by means of converted information storing medium reading device 92. The resulting B, G and R digital exposure amount photographic image information is sent to synthesizing processing section 38.

Synthesizing processing section 38 sends B, G and R digital exposure amount photographic image information as the digital exposure amount image information as it is to developing effect among photosensitive layers correction section 39 based on information inputted by a keyboard. In addition, synthesizing processing section 38 synthesizes a template image sent from template image selection section 43 or character image information sent from character image information generating section 44 and, then, sent the resulting B, G and R digital exposure amount image information to developing effect among photosensitive layers correction section 39.

When an image is subjected to synthesizing and processing, B, G and R digital exposure amount photographic image information sent to synthesizing processing section 38 from digital exposure amount conversion section 37 is further sent to monitor signal conversion section 45. At monitor signal conversion section 45, aforesaid B, G and R digital exposure amount photographic image information is converted to B, G and R monitor signals. Aforesaid monitor signals are sent to monitor 98 from monitor sending section 46 so that a photographic image is caused to be displayed on the monitor.

When the operator inputs a value of the template image to be selected and a character to be synthesized from keyboard 91, central control section 49 produces keyboard inputting information 47. Template image selection section 43 selects the template image which corresponds to the template image selected based on keyboard information 47 from the template image stored in template image storing section 42 and sends it to synthesizing section 38. In addition, character image producing section 44 produces character image based on keyboard information 47 and sends it to synthesizing section 38.

Synthesizing processing section 38 synthesizes a pattern image such as a template image and a character image sent and B, G and R digital exposure amount photographic image information by means of a synthesizing and processing method described later, and sends it to developing effect among photosensitive layers correction section 39.

Developing effect among photosensitive layers correction section 39 obtains B, G and R digital exposure amount image information (B, G and R 8 bit gradation image information) wherein influence by developing effects among photosensitive layers is corrected from B, G and R digital exposure amount image information sent based on developing effect among photosensitive layers exposure correction amount calculation LUT which is a B, G and 3-D LUT formed based on converted LUT data of developing effect among photosensitive layers correction conversion information which is information for conversion of correcting influence by developing effects among photosensitive layers, and sends it to outputted signal sending section 40. Incidentally, converted LUT data of developing effect among photosensitive layers exposure correction amount calculation LUT is calculated by a method described later.

Outputted signal sending section 40 sends B, G and R digital exposure amount image information wherein influence by developing effects among photosensitive layers has been corrected to film recorder 5 from sending line 59.

[Film recorder]

Figure 3:
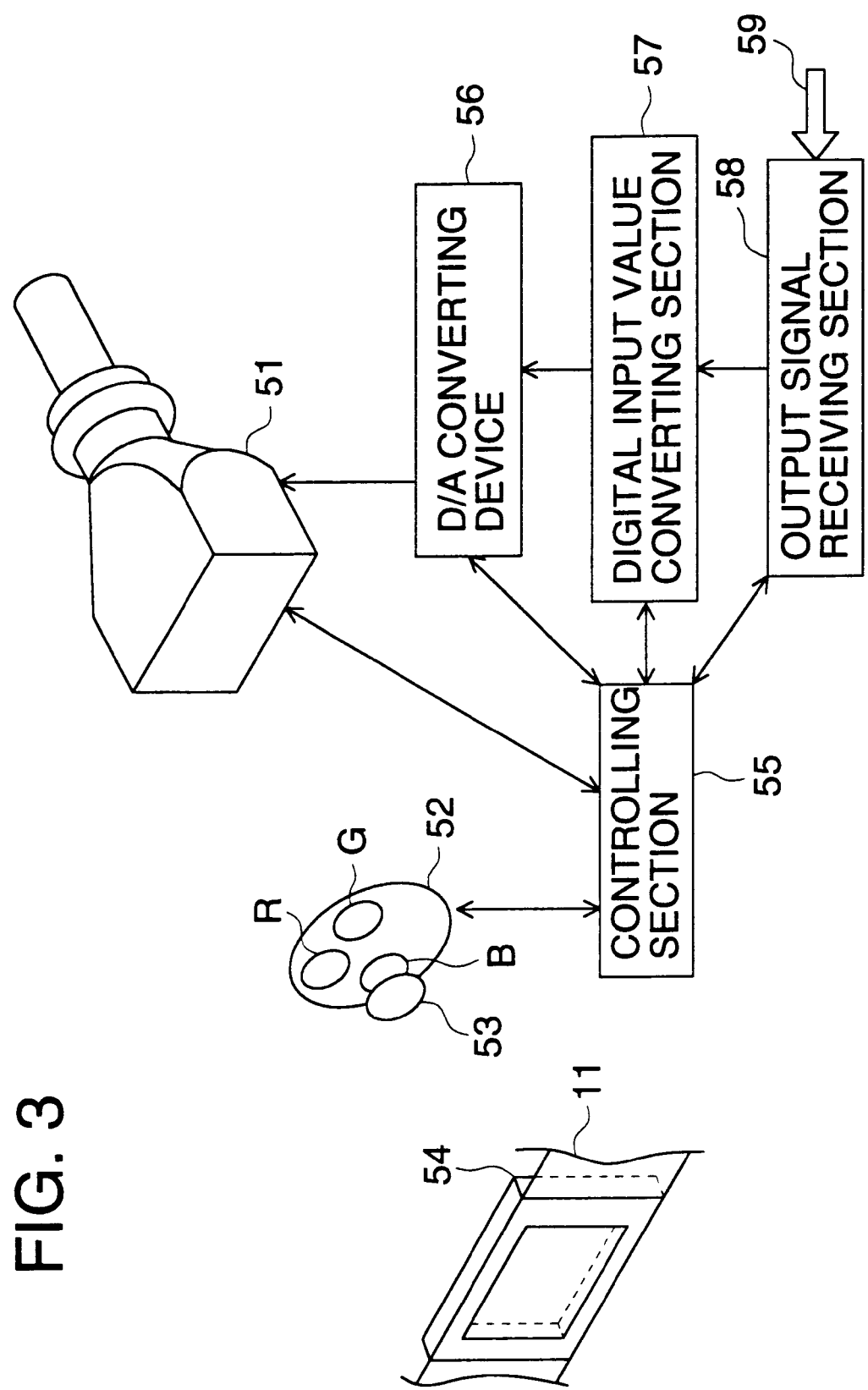
FIG. 3 shows a schematic block diagram of a film recorder of an image outputting system of Embodiment 1.

Next, film recorder 5 will be explained referring to FIG. 3 which is a schematic block diagram of film recorder.

The control section controls each section based on information from each section. In addition, when a control signal is sent from image processing apparatus 3 through sending line 59, outputted signal receiving section 58 sends the control signal to control section 55. Control section 55 conducts control depending upon such. For example, the control includes setting of the digital input value conversion LUT for B, G and R formed based on the conversion LUT data of the digital input value conversion information onto digital input value conversion section 57, when conversion LUT data of digital input value conversion information which is information for converting digital exposure amount to the digital input value is sent.

Outputted signal receiving section 58 receives B, G and R digital exposure amount image information (B, G and R 8 bits image information) sent from image processing apparatus 3 through sending line 59 wherein influence by developing effects among photosensitive layers has been corrected, and sends it to digital input value conversion section 57. Digital input value conversion section 57 obtains B, G and R digital input value image information (B, G and R 12 bits gradation image information) from B, G and R digital exposure amount image information sent based on the digital input value conversion LUT for B, G and R formed based on the conversion LUT data of digital input value conversion information which is information for converting digital exposure amount to digital input values, and sends it to D/A conversion section 56. Incidentally, the conversion LUT data of digital input value conversion information will be calculated by a method to be described later.

D/A conversion section 56 converts received B, G and R digital input value image information (B, G and R 12 bits gradation image information) to analogue signals in the order of B, G and R. Monochrome CRT 51 for digital exposure is caused to display a monochrome image which corresponds to B, G and R image for exposure. Exposure lens 53 is located in such a manner that the monochrome image displayed on monochrome CRT 51 for digital exposure is image-formed on silver halide color negative light-sensitive film 11 for copying. In synchronizing the timing with that aforesaid image information is converted to analogue signals in the order of B, G and R and the monochrome image, which corresponds to B, G and R image for digital exposure, is caused to display, B, G and R filters on filter wheel 52 located in the vicinity of the exposure path of exposure lens 53 is rotated to be adjusted.

Thus, in the order of B, G and R, an image to be copied is digitally exposed on silver halide color negative light-sensitive film 11 for copying.

[Production method of converted information in which LUT data of the digital input value conversion LUT is stored]

Figure 4:
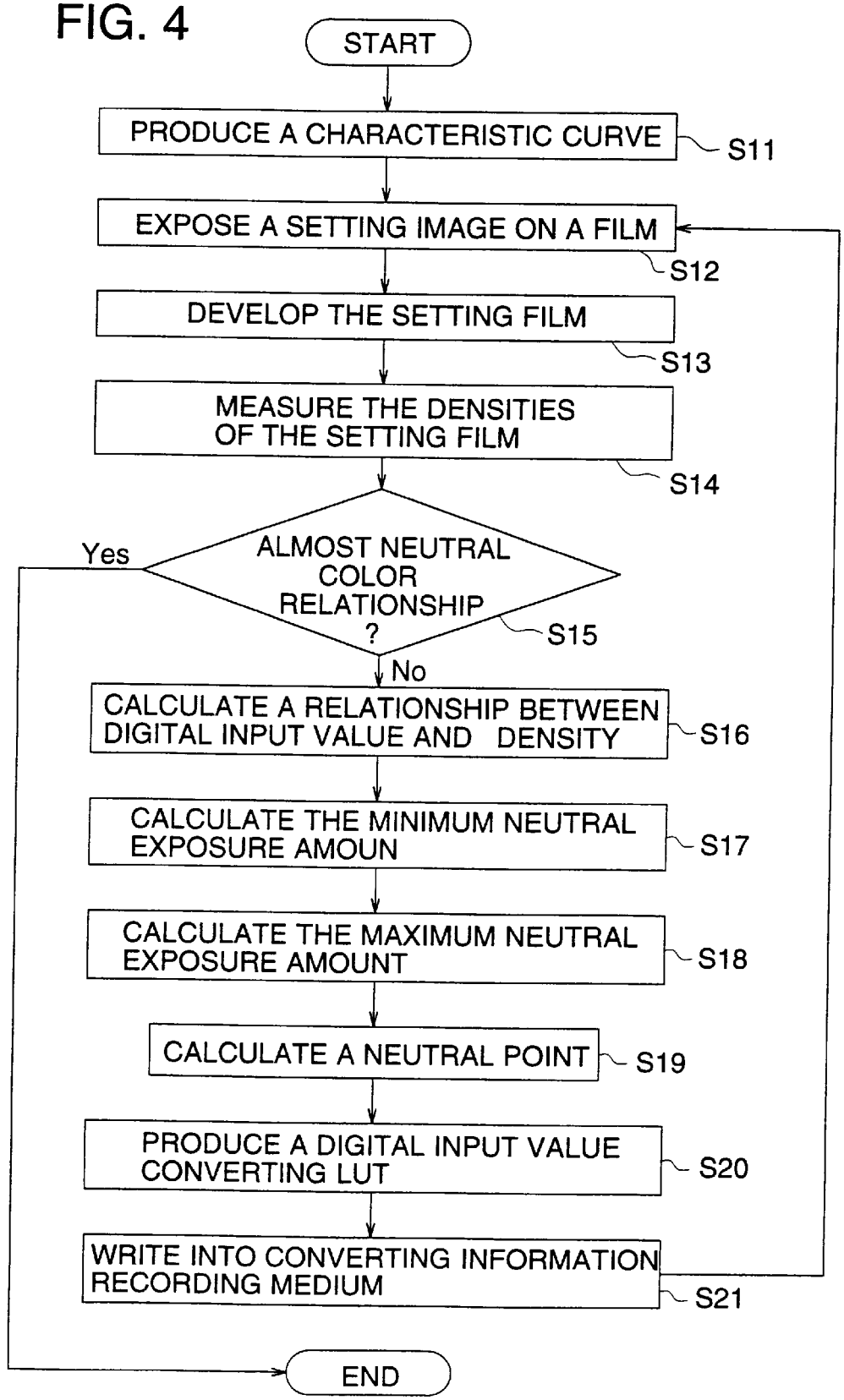
FIG. 4 shows a flow diagram in Embodiment 1 until the LUT data of the digital input value conversion LUT is prepared and aforesaid LUT data is stored on a conversion information storing medium.

Next, based on FIG. 4 which is a flow diagram since LUT data of the digital input value conversion LUT is prepared until aforesaid data is stored in the conversion information storing medium, the flow since LUT data of the digital input value conversion LUT is prepared until aforesaid data is stored in the conversion information storing medium will be explained.

First, the kind of light-sensitive film for copying use which will be the standard for preparing the digital input value conversion LUT is selected, and then, start the operation. Advance to S11. As a light-sensitive film for copying, purely light-sensitive film for copying may be used. However, a light-sensitive film for ordinary photographing may also be substituted therefor. In addition, a reversal light-sensitive film or a negative light-sensitive film may be used. Further, a color light-sensitive film or a monochrome light-sensitive film may be used. In the present embodiment, in order to prepare the digital input value conversion LUT for color negative light-sensitive film for ordinary photographing, LV100 produced by Konica Corporation (trade name) will be used.

Figure 5:
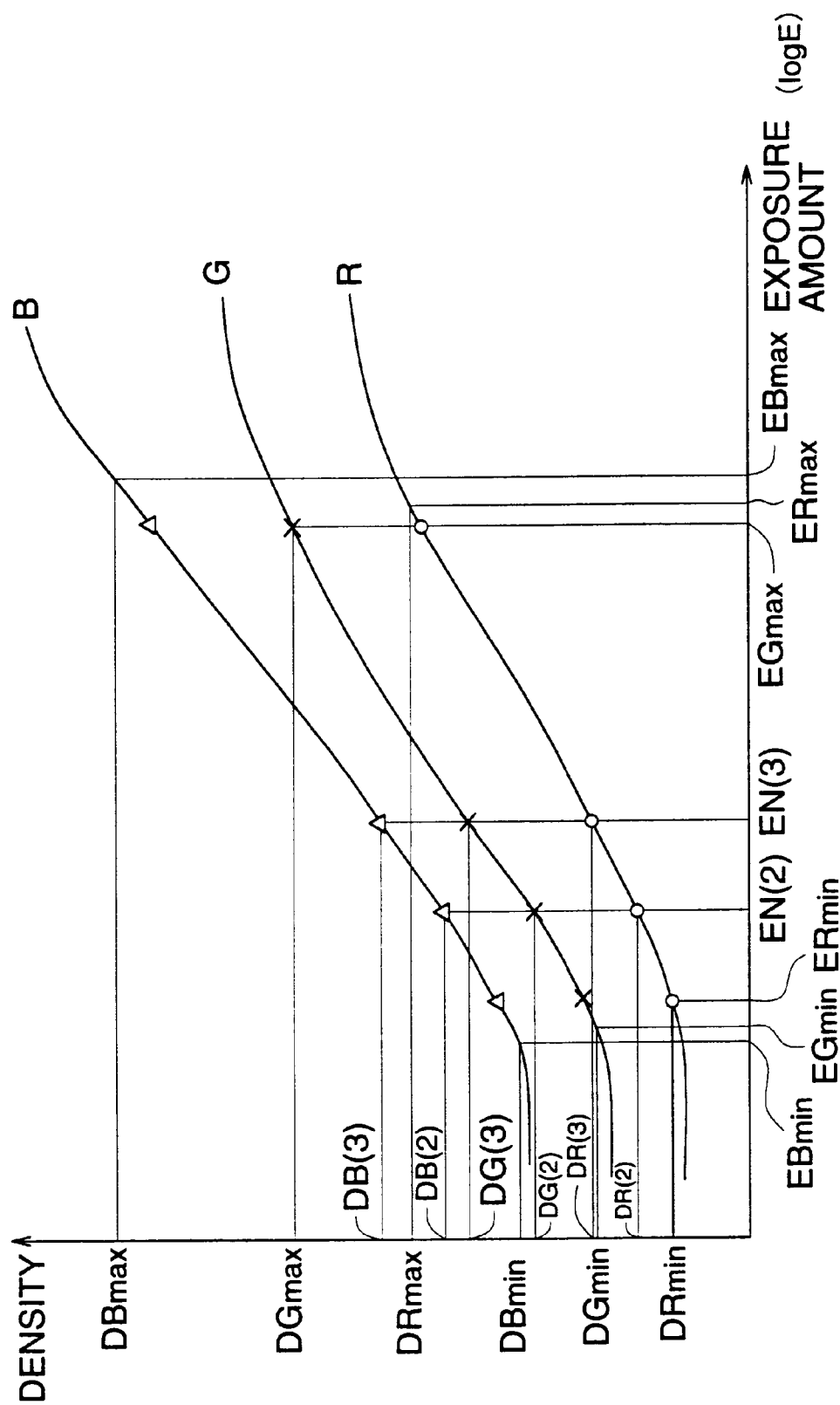
FIG. 5 is a drawing showing an example of the characteristics curves of Embodiment 1.

At S11, characteristics curves of LV100 (the trade name) produced by Konica Corporation in accordance with densitometer 7 to be used are prepared, and then, the process advances to S12. These characteristic curves show the relationship between exposure amount (logE scale) and density measured by densitometer 7. In addition densitometer 7 is an X-Rite 811 TR (the trade name), which conducts measurement using the status M of the X-Rite 811 TR (the trade mark). From aforesaid characteristic curves, first information showing relationship between digital exposure amount data and density value of the developed image of LV100, (the trade mark) produced by Konica Corporation, generated by the digital exposure amount data is obtained. FIG. 5 shows an example of aforesaid characteristic curves. In FIG. 5, the vertical axis represents density value, and the horizontal axis represents exposure amount.

At S12, a latent image of a step chart which is an image for setting a conversion table is formed on light-sensitive film 14 for setting a conversion table is formed, and then, the process advances to S13. Namely, one roll of LV100, (the trade mark) produced by Konica Corporation, is used as light-sensitive film 14 for setting a conversion table on which the latent image of the step chart based on multi-steps of digital input value for obtaining the second information which shows the relationship between the digital input value and the density information of the developed image of LV100, (the trade mark) produced by Konica Corporation, generated by the above-mentioned digital exposure amount is formed, on which the latent image of the step chart based on multi-steps of digital input value is formed.

Figure 6:
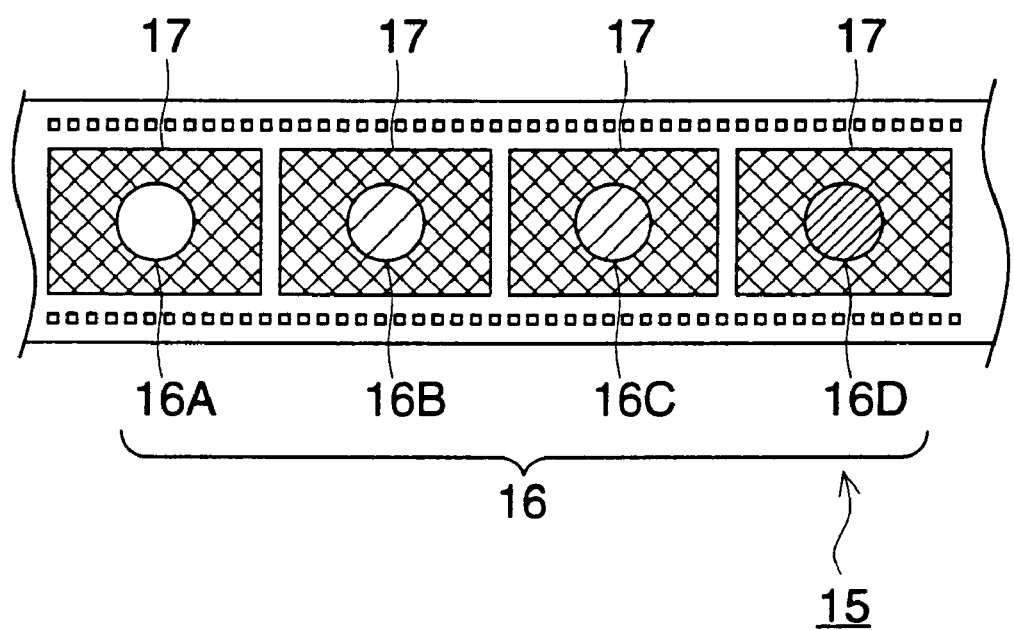
FIG. 6 is a drawing showing an example of a film for setting a conversion table of Embodiment 1.

FIG. 6 shows an example of film 15 for setting a conversion table wherein the latent image of the step chart is formed and developed. On film 15 for setting a conversion table, in each frame, one density measurement regions 16 is provided at the center of each frame. On the other area of each frame, a prescribed exposure region 17 in which a prescribed exposure amount has been exposed is provided. The prescribed exposure region 17 is provided with an exposure amount of 10 to 50% of the effective exposure amount. Herein, the effective exposure amount is defined as the difference between the maximum exposure amount to obtain the lowest density and the minimum exposure amount to obtain the highest density. The exposure amount of 10% of the effective exposure amount is obtained by adding 10% of the effective exposure amount into the maximum exposure amount to obtain the lowest density. In the case of producing a usual negative film, it may be preferable from the view of an actual operation to use 25% of the effective exposure amount. Specifically, in the system in which the image is formed by forming an image on a screen surface of a film recorder, the lowest density tends to become high due to flare. Accordingly, it is preferable to use an exposure amount necessary for making the difference from actual base to the minimum. In the present embodiment, the prescribed exposure region 17 is defined to be exposed with the exposure amount corresponding to output signal of 64. R, G, B exposures having a neutral color relationship are conducted separately on the density measurement regions 16 for each frame with continuously changed digital input values. More concretely, the first frames are exposed with B,G,R exposure by the digital input value "0", the second frames are exposed by the digital input value "9", the third framed are exposed by the digital input value "18" and so on. Incidentally, in the present embodiment, only a single chart is recorded in a single frame. However, in order to conduct the measurement more efficiently, plural charts are recorded in a singly frame. Further, the prescribed exposure region 17 is exposed with the fixed digital input value of 64. The digital input value for the prescribed exposure region 17 may be changed in such a manner that the averaged exposure value of the density measurement region 16 and the prescribed exposure region 17 becomes 25%.

A non-exposure area may be provided in a bar shape in such a manner as a white bar for clearly providing a border between density measurement regions 16 and prescribed exposure region 17 when exposure amount ratio of the density measurement regions 16 to the prescribed exposure region 17 is 1.0.

At S13, light-sensitive film 14 for setting a conversion table wherein the latent image of the step chart is developed with film developing machine 6 for obtaining film 15 for setting a conversion table, and then, the process advances to S14.

At S14, by means of densitometer 7, B, G and R densities of each density measurement regions 16 is measured, and then, the process advances to S15.

At S15, from the density measured, it is evaluated whether or not B,G,R measurement density values on all density measurement regions 16 of film 15 for setting a conversion table are in the neutral color relationship respectively. If B,G,R measurement density values on a part of density measurement regions among all density measurement regions 16 of film 15 for setting a conversion table are not in the neutral color relationship, the process proceeds to S16. If B,G,R measurement density values on all density measurement regions 16 of film 15 for setting a conversion table are respectively in the neutral color relationship for each of digital input value, the process (flow chart) is ended.

At S16, the relationship between the digital input value and the density is calculated for each of B, G and R from B, G and R digital input value of each density measurement regions 16 wherein the latent image was formed at S12 and B, G and R densities of each density measurement regions 16 measured and obtained at S14, and then, the process advances to S17.

Figure 7:
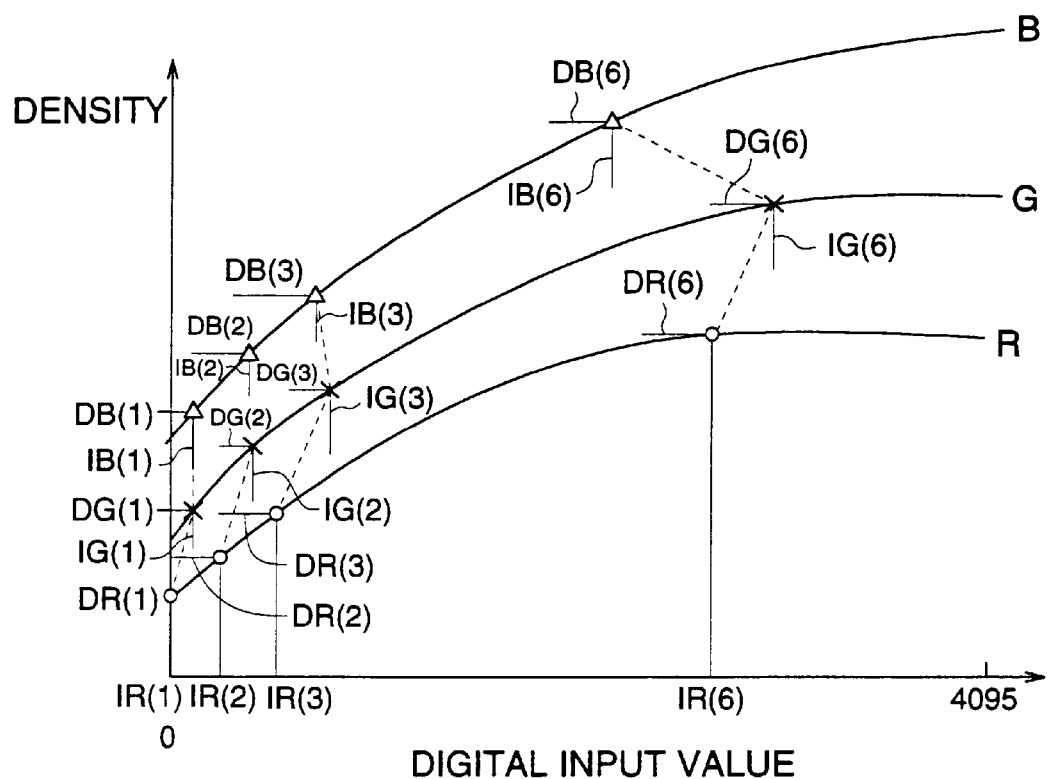
FIG. 7 is a drawing showing relationship between the digital input value and density obtained by Embodiment 1.

FIG. 7 shows the relationship between the resulting digital input value and the density. In FIG. 7, the vertical axis represents density and the horizontal axis represents digital input value.

At S17, the minimum neutral exposure amount ENmin is obtained, and then, the process advances to S18. By using B,G,R densities measured at S14 from the density measurement regions exposed with the minimum exposure amount among the density measurement regions 16, exposure amounts corresponding to the B,G,R densities respectively are obtained from the characteristic curves obtained at S11. The maximum exposure amount among the obtained exposure amounts is defined as the minimum neutral exposure amount ENmin. For example, the above-mentioned process is explained referring to the drawings used so far. In FIG. 6, the density measurement regions exposed with the minimum exposure amount among the density measurement regions 16 is density measurement regions 16A in which the B, G and R digital input values are respectively zero. In order to obtain the maximum exposure amount from the characteristic curves obtained at S11 by using B,G,R densities DBmin, DGmin, DRmin measured from the density measurement regions 16A at S14, exposure amount EBmin, EGmin, ERmin corresponding to B,G,R densities DBmin, DGmin, DRmin are obtained from FIG. 5, and the maximum exposure amount among the exposure amount EBmin, EGmin, ERmin is obtained. In FIG. 5, since ERmin is the maximum exposure amount, ERmin is the minimum neutral exposure amount ENmin.

There may be the case that a required density range is not obtained depending on the kind of a negative film when a LUT for outputting is obtained for the negative film by the beformentioned method. Such a case occurs so often when the negative film is a soft tone type film whose γ-portion (a straight line portion) on the characteristic curve is relatively short. Especially, when a slope on foot portion is relatively long, such a case may occurs so often. In this case, it is preferable not to use the foot portion on which density change is small for the exposure change, and it is necessary to set an exposure region so as to obtain a required density range for a printing paper. As a concrete method, the digital exposure amount signals are defined in such a manner that a center value of a range of image signals is adjusted so as to fit with a center point between the reproducible highest density and the lowest density. When the density change for the exposure change becomes a predetermined relationship, the production of LUT is started. In this case, it may be preferable to start the production of LUT from a point of 1/10 of the γ-portion on the characteristic curve. It may be more preferable to start it from a point of 1/10 of the γ-portion. Incidentally, it may be preferable to use a negative film whose γ-portion on the characteristic curve has a sufficient length to obtain a required density range.

At S18, the maximum neutral exposure amount ENmax is obtained, and then, the process advances to S19. The density measurement regions exposed with the maximum exposure amount among the density measurement regions having B,G,R densities higher than that of the density measurement regions exposed with a exposure amount smaller one step in the step chart of the density measurement regions 16 are used as the maximum neutral density measurement regions. By using B,G,R densities measured at S14 from the maximum neutral density measurement, exposure amounts corresponding to the B,G,R densities respectively are obtained from the characteristic curves obtained at S11. The minimum exposure amount among the obtained exposure amounts is defined as the maximum neutral exposure amount ENmax. For example, the above-mentioned process is explained referring to the drawings used so far. Assuming that B,G,R densities in the i-th density measurement regions are DB(i), DG(i), DR(i), in order to satisfy the condition that the n-th density measurement regions having densities of DB(n), DG(n), DR(n) corresponds to the density measurement region having B,G,R densities higher than densities of DB(n−1), DG(n−1), DR(n−1) of the density measurement regions exposed with the exposure amount smaller by one step, it is necessary to satisfy the following conditional expressions.

$$DB(n) > DB(n-1)$$

$$DG(n) > DG(n-1)$$

$$DR(n) > DR(n-1)$$

Then, the density measurement regions exposed with the maximum exposure amount among the density measurement regions satisfying the condition is used as the maximum neutral density measurement region. Since usually digital exposure amount is simply increased with the digital input value, the density measurement regions exposed with the maximum digital input value among the density measurement regions 16 is used as the maximum neutral density measurement regions.

In order to obtain the minimum exposure amount from the characteristic curves obtained at S11 by using B,G,R densities DBmax, DGmax, DRmax measured from the maximum neutral density measurement regions at S14, exposure amount EBmax, EGmax, ERmax corresponding to B,G,R densities DBmax, DGmax, DRmax are obtained from FIG. 5, and the minimum exposure amount among the exposure amount EBmax, EGmax, ERmax is obtained. In FIG. 5, since EGmax is the minimum exposure amount, EGmax is the maximum neutral exposure amount ENmax.

At S19, from minimum neutral exposure amount ENmin and the maximum neutral exposure amount ENmax, a neutral exposure amount is appropriately selected, and then, a digital input value in accordance with the selected neutral exposure amount is calculated, and then the process advances to S20. Namely, the exposure amount which divides the span between the minimum neutral exposure amount and the maximum neutral exposure amount into M-equivalent increments (wherein M is suitably 5–10) is respectively defined to be neutral exposure amount (EN (i):i=1 to M+1). Incidentally, the following equations can be held:

$$ENmin = EN(1)$$

$$ENmax = EN(M+1)$$

B, G and R densities corresponding to each (EN (i):i=1 to M+1) is calculated from the characteristic curve. From B, G and R densities corresponding to each (EN (i):i=1 to M+1), B, G and R digital input values corresponding thereto are calculated based on the relationship between the digital input values for B, G and R and density.

Hereinafter, an example will now be explained using the drawings used for the explanation so far. In FIG. 5, exposure amount points which divide the minimum neutral exposure amount and the maximum neutral exposure amount into 5 equal sections are respectively defined to be neutral exposure amount points (EN (i):i=1 to 6). Incidentally, in aforesaid occasion, the following equations can be held.

$$ENmin = ERmin = EN(1)$$

$$ENmax = EGmax = EN(6)$$

B, G and R densities (DR (i), DG (i), DB (i):i=1 to 6) corresponding to each neutral exposure amount (EN (i):i=1 to 6) are calculated from B, G and R characteristics curves. In FIG. 5, only DR (2), DG (2), DB (2), DR (3), DG (3) and DB (3) are typically represented.

In addition, from B, G and R densities (DR (i), DG (i), DB (i):i=1 to 6) corresponding to each neutral exposure amount (EN (i):i=1 to 6), B, G and R digital input values (IR (i), IG (i), IB (i):i=1 to 6) corresponding thereto are calculated based on the relationship between the digital input value for B, G and R densities. In FIG. 7, only DR (1), DG (1), DB (1), DR (2), DG (2), DB (2), DR (3), DG (3), DB (3), DR (6), DG (6) and DB (6) and IR (1), IG (1), IB (1), IR (2), IG (2) IB (2), IR (3), IG (3), IB (3), IR (6), IG (6) and IB (6) are typically represented.

Figure 8:
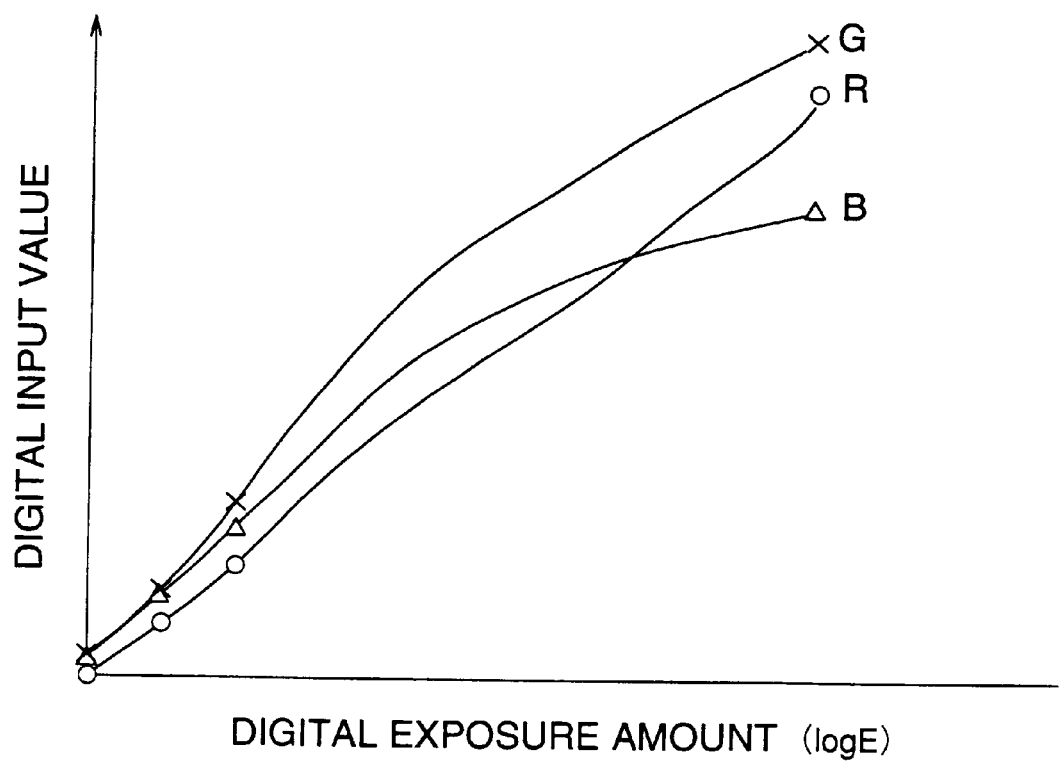
FIG. 8 is a drawing showing relationship between the digital input value and digital input value obtained by Embodiment 1.

At S20, based on the relationship between the neutral exposure amount selected at S19 and the digital input value against the selected neutral exposure amount, B, G and R LUT data for converting exposure amount to B, G and R digital input value from B, G and R digital exposure amount are calculated, and then, the process advances to S21. Practically, from the neutral exposure amount (EN (i):i=1 to 6) and B digital input value (IB (i):i=1 to 6) corresponding thereto, B LUT data is obtained. From the neutral exposure amount (EN (i):i=1 to 6) and G digital input value (IG (i):i=1 to 6) corresponding thereto, G LUT data is obtained. From the neutral exposure amount (EN (i):i=1 to 6) and R digital input values (IR (i):i=1 to 6) corresponding thereto, R LUT data is obtained. As a method of determining the LUT data from the above-mentioned intermittent data, various conventional methods such as a linear interpolation method and a spline interpolation method can be used. FIG. 8 is a drawing showing an example of relationship between the resulting digital exposure amount and the digital input value.

At S21, LUT data for each of B, G and R calculated at S20 are stored in a conversion information storing medium. Thus, the flow chart returns to S12.

The conversion information storing medium in which aforesaid information is stored is supplied to the other image outputting system by means of an image outputting system which belongs to the same model as the image outputting system of the present Embodiment. Aforesaid conversion information is read from the conversion information storing medium in which aforesaid information is stored by means of conversion information storing medium reading device 92 which belongs to aforesaid image outputting system. Aforesaid information is used for converting B, G and R digital exposure amount to B, G and R digital input value by means of a film recorder.

Incidentally, it goes without saying that the resulting conversion information may be used in the film recorder of the image outputting system of the present Embodiment. In addition, aforesaid conversion information may be supplied to the other image outputting systems by means of an image outputting system belonging to the same model as the image outputting of the present Embodiment through a network, and may also be converted to B, G and R digital input values from B, G and R digital exposure amounts by means of the film recorder of aforesaid image outputting system.

By forming conversion information only by means of a digital input value having an area in which the digital exposure amount given to a light-sensitive material as described above the digital exposure amount given to the light-sensitive material by the maximum exposure amount and the minimum exposure amount becomes neutral. Accordingly, black and white on a print obtained from a film for copying respectively become neutral colors, or are easily neutrally reproduced.

LUT data produced by the image outputting system of the present embodiment may be used for the other image outputting system and an image outputting system having a different type film developing machine if the same type film recorder is employed. In this case, it may be possible to handle with a print level change of the printer processor to record on a printing paper. Further, not only a different manufacturing No. or a different emulsion No. of the recording film may be permissible, but also that it may be possible to reproduce on a different kind of a negative film (for example, JX100 and LV200 both manufactured by Konica Corporation, Super Reala Ace 100 manufactured by Fuji Film Co., Ltd, and Gold 100 manufactured by Eastman Kodak Photo Company) with the same difference as that in the time of usual photography. In addition, it may be possible to record on a reversal film with color reproduction by which difficulty in observation is not caused. As the reversal film, Sinra manufactured by Konica Corporation, RDP manufactured by Fuji Film Co., Ltd, and EDP manufactured by Eastman Kodak Comapany are listed.

[Synthesizing method for pattern image and digital exposure amount photographic information]

In the present embodiment, in order that a black pattern image is reproduced with pure black and a white pattern image is reproduced with pure white in the time of printing, a range of digital exposure amount of the digital exposure amount photographic image information is compressed within a part (a photographic image recording region) of a recordable digital exposure amount region on which the digital exposure can be conducted with the neutral color relationship among RGB characteristics curves of the copying color negative film. On the other hand, the digital exposure amount for the pattern image is so set that the pattern image is recorded on pattern image recording regions at a lower density side and at a higher density side apart from the part of the recordable digital exposure amount region for recording the photographic image.

Figure 9:
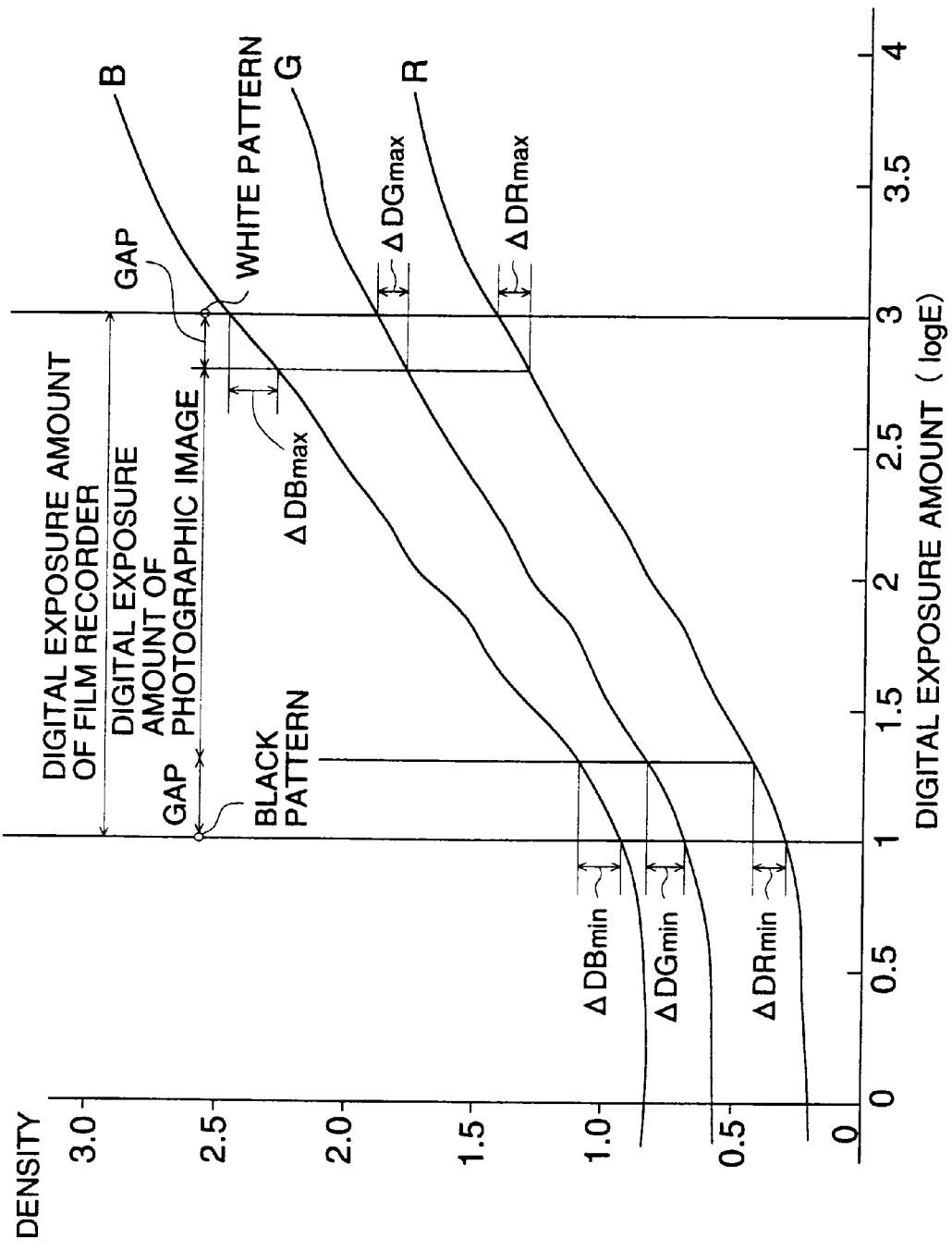
FIG. 9 is a drawing showing relationship between the digital exposure area of a film recorder, digital exposure area of photographic image and digital exposure amount of pattern image and their densities obtained by Embodiment 1.

Hereinafter, practical explanations will be made based on FIG. 9 showing the relationship between the digital exposure amount and density. The digital exposure amount area in which neutral digital exposure by the film recorder is capable is a digital exposure amount area between the minimum neutral exposure amount calculated at S17 and the maximum neutral exposure amount calculated at S18 by a producing method of conversion information in which the LUT data of the above-mentioned digital input value conversion LUT is stored. If the digital exposure amount falls between the above-mentioned neutral exposure amounts, neutral print can be obtained. Accordingly, the pattern image can be reproduced neutrally on a print, provided that the above-mentioned digital exposure amount and the minimum digital exposure amount are used as the digital exposure amount for the pattern image.

Since the digital exposure amount area of a photographic image and that of a pattern image differ from each other, density gaps (DDBmax, DDGmax, DDRmax, DDBmin, DDGmin and DDRmin) are created between the recording density areas of B, G and R photographic images and that of the pattern image. Accordingly, even if the neutrality of a film recorder is shifted or neutrality of the photographic image is modified on the printer processor side, the pattern image is not noticeably fluctuated from neutrality.

[Producing method of the LUT data converted by the developing effect among photosensitive layers exposure correction amount calculating LUT]

By means of a method of producing conversion information in which the LUT data of the digital input value conversion LUT is identical to one explained in S11, not only characteristic curves by means of a neutral color exposure but also characteristic curves by means of B, G, R, Y, M and C are calculated. Incidentally, Y, M and C exposure respectively represent digital exposure amount exposure in which G and R are equal, that in which R and B are equal and that in which B and G are equal.

Several neutral exposure amounts are selected from the exposure amount between the maximum neutral exposure amount and the minimum neutral exposure amount. For each of the neutral exposure amount selected and for each of B, G and R, a digital exposure amount providing equal density is calculated from the characteristic curves which respectively relate to exposure. From the difference of the resulting digital exposure amounts, by means of multiple regression analysis, the LUT data converted by the developing effect among photosensitive layers exposure correction amount calculating LUT is calculated.

Figure 10:
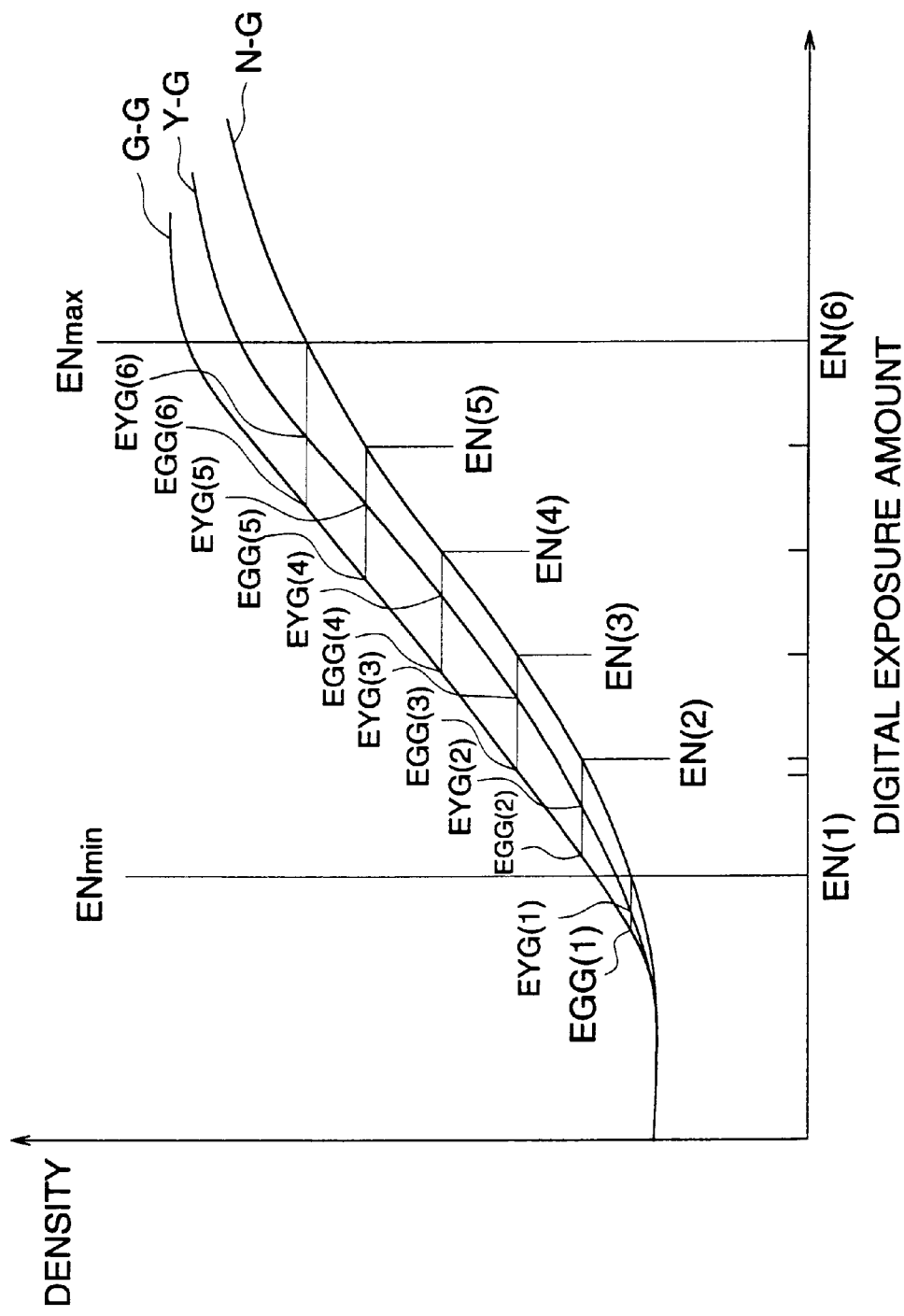
FIG. 10 is a drawing for showing a characteristic curve by means of G color and a neutral color exposure, a characteristic curve by means of G exposure and a characteristic curve by means of a Y exposure for explaining a method of digital exposure amount providing equal densities each other from characteristic curve related to B, G, R, Y, M and C exposure other than neutral exposure about each of neutral exposure amount selected by Embodiment 1.

Hereinafter, a practical explanation will be made based on FIG. 10 showing an example of a characteristic curve of G color by means of neutral color exposure, a characteristic curve of G color by means of G exposure and a characteristic curve of G color by means of Y exposure. The digital exposure amount area between the maximum neutral exposure amount and the minimum neutral exposure amount is divided into 5 portions equally each other so that each digital exposure amount (EN (i):i=1 to 6) will be selected. Density of G color corresponding to each digital exposure amount (EN (i):i-1 to 6) will be calculated, and then, the digital exposure amount providing aforesaid G color density by means of G exposure (EGG (i):i=1 to 6) will be calculated and the digital exposure amount providing aforesaid G color density by means of Y exposure (EYG (i):i=1 to 6) will be calculated. In addition, though not illustrated, the digital exposure amount providing aforesaid G color density by means of C exposure (ECG (i):i=1 to 6) will be calculated. With regard to B and R colors, data are similarly calculated. From these, by means of multiple regression analysis, the LUT data converted by the developing effect among photosensitive layers exposure correction amount calculating LUT is calculated.

Embodiment 2

The present embodiment is a varied embodiment of Embodiment 1. The present embodiment is the same as Embodiment 1 except that a method of reproducing the pattern image and the photographic image with a distant densities.

Figure 11:
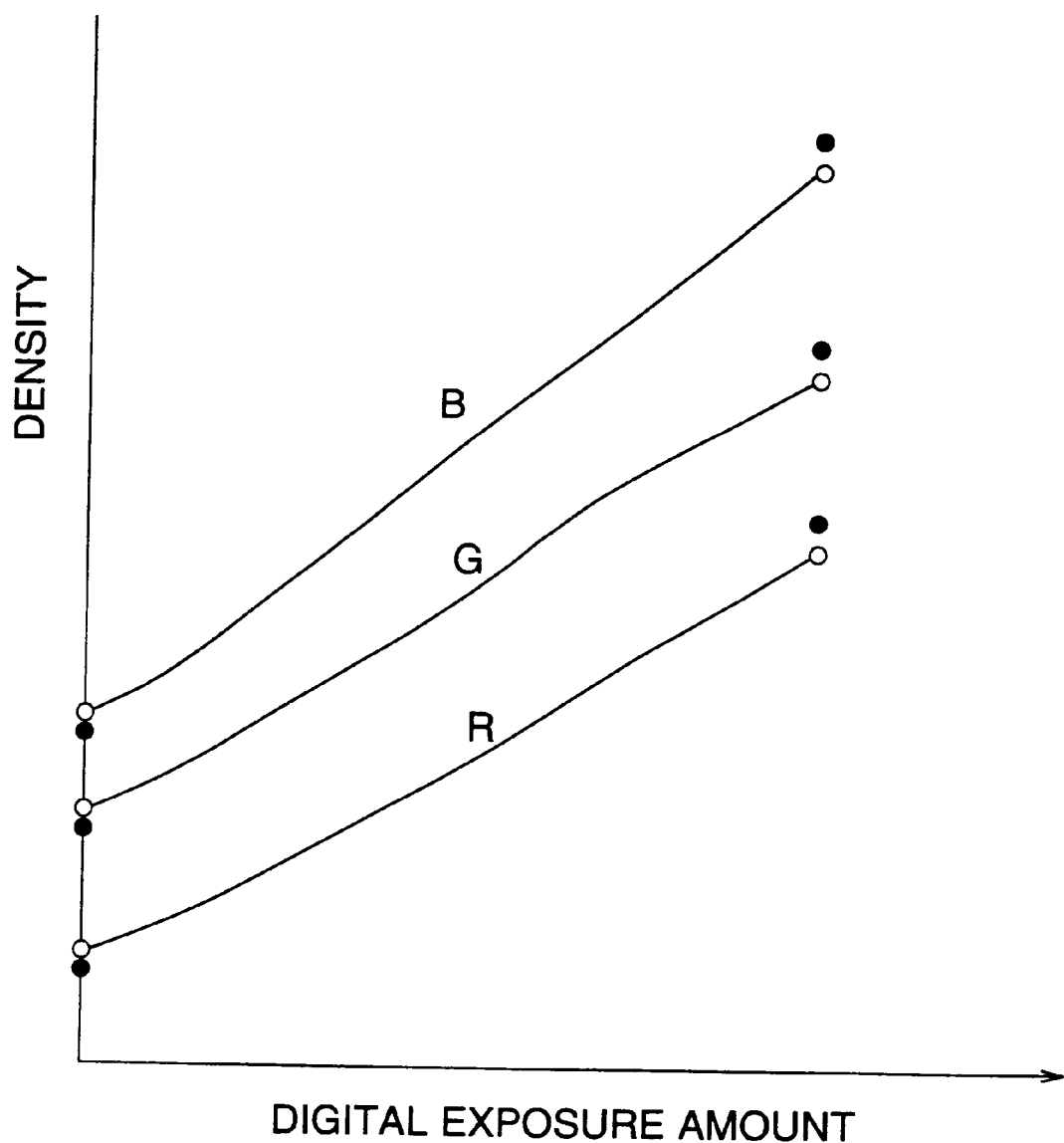
FIG. 11 is a drawing showing B, G and R densities reproduced from B, G and R digital exposure amount in Embodiment 2.

Since density gaps (DDBmax, DDGmax, DDRmax, DDBmin, DDGmin and DDRmin) are created between the recording density areas of B, G and R photographic images and that of the pattern image, even if the neutrality of a film recorder is shifted or the neutrality of photographic image is modified on the printer processor side, in order that the pattern image is not noticeably fluctuated from the neutrality, digital exposure is set in such a manner that digital exposure is conducted using all areas of the digital exposure amount area which records the digital exposure amount of the photographic image. There is yet another method. Namely, digital exposure is set at either of the digital exposure amount both limit of the digital exposure amount area which records the digital exposure amount information of the pattern image. Then, the conversion LUT data which converts B, G and R digital exposure amount of the film recorder to B, G and R digital input value are reproduced to B, G and R densities as shown in FIG. 11 from the B, G and R digital exposure amounts.

Incidentally, it may be permissible that, by allocating the digital exposure amount signals for the density gap, it make possible to correct a color deviation due to a hardly expected density change caused by flare.

Embodiment 3

The present embodiment is a variation of Embodiment 1, in which film density conversion section 35, color correction section 36 and digital exposure amount conversion section 37 are modified. Namely, film density conversion section 35 and digital exposure amount conversion section 37 are replaced with one LUT conversion section. The color correction section is provided after the LUT conversion section. One of the LUTs in aforesaid LUT conversion section converts color digital photographic image information to B, G and R digital exposure amounts, and then, at the color correction section, the color of B, G and R digital exposure amount is corrected.

Here, in accordance with the kind of color digital photographic image information, the LUT conversion section selects the LUT, and conducts the following processing.

(1) In the case of color digital photographic image information having B, G and R densities obtained by image-sensing a color negative film:

B, G and R digital exposure amount photographic image information is made by means of the digital exposure amount conversion LUT identical with that in digital exposure amount conversion section 37 in Embodiment 1. Incidentally, the LUT data of aforesaid digital exposure amount conversion LUT can be obtained from the characteristic curve of a color negative film to be subjected to digital exposure.

(2) In the case of color digital photographic image information having B, G and R densities obtained by image-sensing a color reversal film:

B, G and R digital exposure amounts photographic image information is made by means of the digital exposure amount conversion LUT obtained by a method to be described later.

(3) In the case of color digital photographic image information having B, G and R densities obtained by image-sensing a color reflection original:

B, G and R digital exposure amount photographic image information is made by means of the digital exposure amount conversion LUT obtained by a method to be described later.

(4) In the case of color digital photographic image information expressed by a color space system other than B, G and R densities:

Color digital photographic image information expressed by a color space system other than B, G and R densities is converted to color digital photographic image information having B, G and R densities by means of the LUT which converts color digital photographic image information expressed by a color space system other than B, G and R densities to color digital photographic image information having B, G and R densities, and to make B, G and R digital exposure amount photographic image information.

[Preparation method of the digital exposure amount conversion LUT which converts B, G and R densities obtained by image-sensing a color reversal film to B, G and R digital exposure amount]

A uniform white light source is photographed on a color reversal light-sensitive film while exposure level is stepwisely changed, and the exposed color reversal light-sensitive film is subjected to photographic processing. B, G and R densities of each frame of the resulting color reversal film is measured with a densitometer. For each of B, G and R, relationship between the relative exposure amount and the density of each color is calculated. The resulting B, G and R densities measured is defined to be B, G and R densities obtained by image-sensing the color reversal film. While, for B, G and R, plotting the relative exposure amount to the density on characteristic curve of a color negative film which is subjected to digital exposure, and from the characteristic curve of the outputted color negative film, the corresponding exposure amount is calculated. Assuming that the resulting exposure amount as the digital exposure amount, the relationship between the resulting B, G and R densities obtained by image-sensing the color reversal film and the digital exposure amount is calculated. Thus, the digital exposure amount conversion LUT which converts B, G and R densities obtained by image-sensing the color reversal film to B, G and R digital exposure amount is prepared.

[Preparation method of the digital exposure amount conversion LUT which converts B, G and R densities obtained by image-sensing a color reflection original to B, G and R digital exposure amount]

A color photographic paper (for example, QAA6 (the trade name)) was exposed while the exposure time was stepwisely changed from the standard exposure, and then, an exposed color photographic paper was subjected to photographic processing. B, G and R densities of each frame of the resulting color print was measured by means of a densitometer, and the relationship between the relative exposure amount and the density of each color was calculated for each of B, G and R. The resulting B, G and R densities measured is defined to be B, G and R densities obtained by image-sensing a color reflection original. In addition, for each of B, G and R, while plotting the relative exposure amount as density on the characteristic curve of a color negative film which was subjected to be digital exposure, the corresponding exposure amount was calculated from the characteristic curve of the outputting color negative film. Provided that the resulting exposure amount was a respectively digital exposure amount, the relationship between B, G and R densities obtained by image-sensing a color reflection original and the digital exposure amount was calculated. Thus, the digital exposure amount conversion LUT which converts B, G and R densities obtained by image-sensing a color reflection original to B, G and R digital exposure amount is prepared.

Embodiment 4

[Constitution of an apparatus]

An image outputting system of the present Embodiment is an example of the present invention, in which color digital photographic image information inputted from an inputting apparatus such as a reflection original scanner and expressed in an arbitrary space system is subjected to image processing, image synthesis processing with pattern image information such as character image is conducted as necessary, a digital input value signal is outputted to a digital printer, the image is subjected to digital exposure on a sheet of color photographic paper in a digital printer and a sheet color photographic paper subjected to digital exposure is subjected to photographic processing to obtain a print. Hereinafter, an apparatus of the present embodiment will be detailed.

Figure 12:
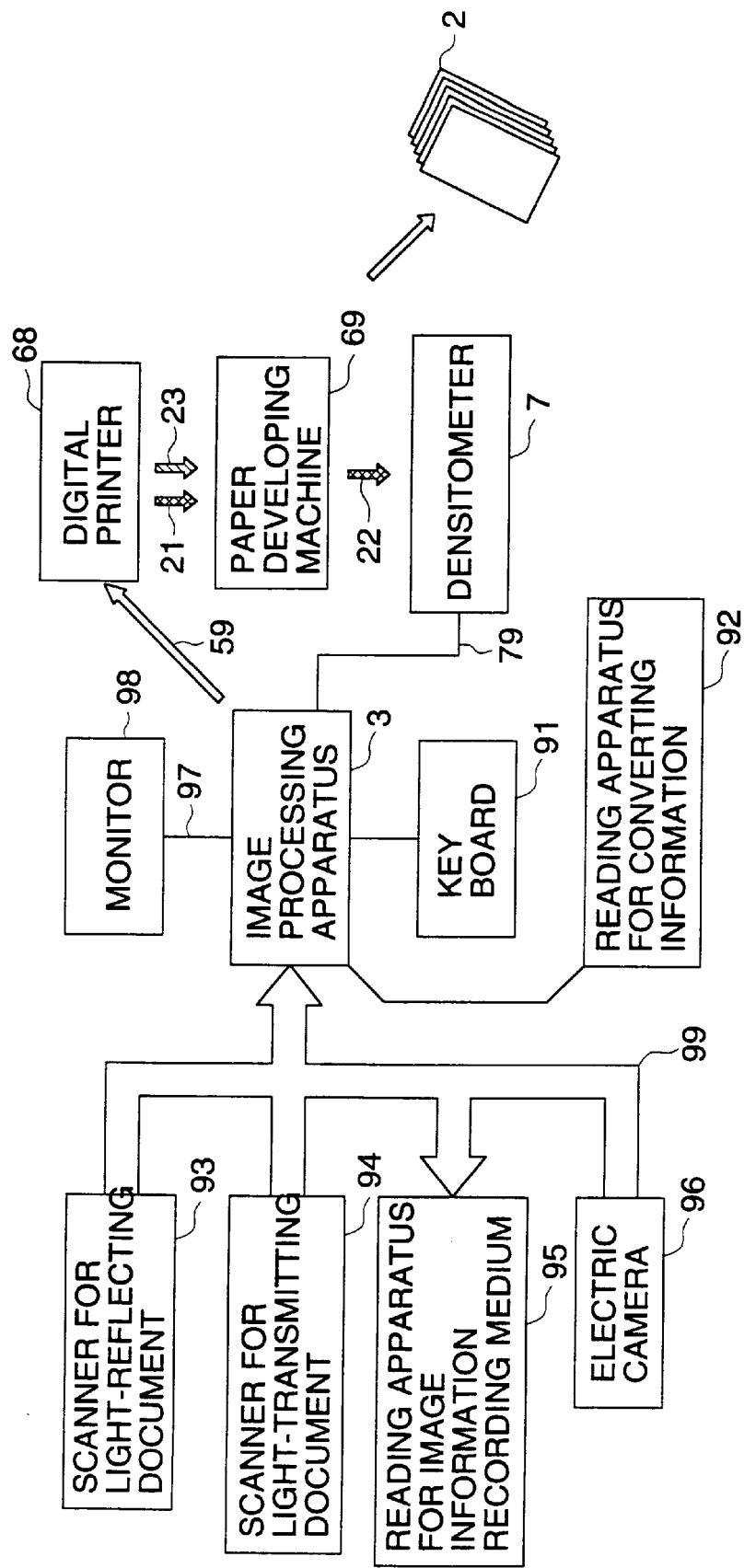
FIG. 12 shows a schematic block diagram of an image outputting system of Embodiment 4.

FIG. 12 shows a schematic block diagram of the present image outputting system. The apparatus constitution of the present embodiment is identical to that of Embodiment 1 except the outputting side of the image processing apparatus. The image processing apparatus converts digital exposure amount image information obtained by synthesis processing to digital input value image information, and inputs the resulting digital input value image information into digital printer 68 through sending line 59. Digital printer 68 is digitally exposed on a light-sensitive film for copying based on digital input value image information. Color photographic paper 23 digitally exposed is subjected to photographic processing by means of paper developing device 69 for obtaining print 2.

[Image processing apparatus]

In the case of a color photographic paper, developing effect among photosensitive layers can be ignored. Therefore, the image processing apparatus has no correction section for developing effect among photosensitive layers. Since the present Embodiment shows an example of the constitution in which there is no conversion section which converts digital exposure amount to digital input value in digital printer 68, the present Embodiment is the same as Embodiment 1 except that a digital input value conversion section from digital exposure amount image information to digital input value image information is provided where there is a correction section for developing effect among photosensitive layers. Hereinafter, those which are different from Embodiment 1 will only be explained.

Synthesis processing section 38 synthesizes a pattern image such as a template image and a character image and B, G and R digital exposure amount photographic image information, and then sends it to the digital input value conversion section.

Further, in this embodiment, exposure amount information becomes an exposure amount for a color printing paper and film density photographic image information in Embodiment 1 is used as print exposure amount photographic image information. Since the digital exposure amount image information corresponds to this information, the structure is such that digital exposure amount information is obtained by conducting only color correction for film density without digital exposure amount converting section 37.

In the synthesis processing section 38, not only that the abovementioned image synthesis processing is conducted, but also that finishing information can be inputted from the outside by using functions of monitor screen and key board input. The image conversion processing is conducted based on the information and the image information is sent to the digital input value converting section.

Now, examples of finishing information and conversion processing for digital exposure amount photographic image information are shown.

Assuming that the digital exposure amount photographic image information before conversion are D(R), D(G), D(B) and the digital exposure amount photographic image information after conversion are D'(R), D'(G), D'(B).

In the case that the finishing information is color density correcting information, by conducting conversion by the formula $$D'(i) = D(i) + \alpha i$$

wherein i=R, G, B
continuous excellent color conversion from a highlight portion to a shadow portion can be conducted easily on a print.

In the case that the finishing information is color contrast converting information, by conducting conversion by the formula $$D'(i) = (D(i) - \beta i) \times \gamma i + \beta i$$

wherein i=R, G, B, and $\beta I$ is a center value of the contrast conversion and is usually set at a point on which no density change is wanted, continuous excellent contrast conversion from a highlight portion to a shadow portion can be conducted easily on a print.

In the case that the finishing information is chroma converting information, by conducting matrix conversion by the formula $ND = (D(R) + D(G) + D(B))/3$ $$\begin{pmatrix} D'(R) \\ D'(G) \\ D'(B) \end{pmatrix} = \begin{pmatrix} M_{11} & M_{12} & M_{13} \\ M_{21} & M_{22} & M_{23} \\ M_{31} & M_{32} & M_{33} \end{pmatrix} \begin{pmatrix} D(R) - ND \\ D(G) - ND \\ D(B) - ND \end{pmatrix} + \begin{pmatrix} ND \\ ND \\ ND \end{pmatrix}$$

chroma conversion such as color emphasis from a highlight portion to a shadow portion can be conducted easily on a print while maintaining gray balance.

Digital input value conversion section obtains B, G and R digital input value image information (B, G and R 12 bit gradation image information) from B, G and R digital exposure amount image information sent from synthesis processing section 38 based on B, G and R digital input value conversion LUT formed based on the conversion LUT data of the digital input value conversion information which is information for converting the digital exposure amount to the digital input value, and then sends to outputting signal forwarding section 40. The conversion LUT data of the digital input value conversion LUT which is an LUT for B, G and R can be calculated by a method identical to that used in Embodiment 1 except a color photographic paper QAA6 (the trade name) produced by Konica Corporation is used in place of LV 100 (the trade name) produced by Konica Corporation. Similarly, the conversion information storing medium which stored the conversion LUT data of aforesaid digital input value conversion LUT can be produced identically as in Embodiment 1.

Incidentally, when the conversion LUT data of aforesaid digital input value conversion LUT which is information used for converting the digital exposure amount to the digital input value is newly set, digital input value conversion LUT for B, G and R based on the conversion LUT data of aforesaid digital input value conversion LUT newly sent.

Outputting signal forwarding section 40 forwards B, G and R digital input value image information (B, G and R 12 bit gradation image information) to digital printer 68 from forwarding line 59.

[Digital printer]

Next, digital printer 68 will be explained. B, G and R digital input value image information (B, G and R 12 bit gradation image information) sent through forwarding line 59 from image processing apparatus 3 is converted to analogue signals in an order of B, G and R. A monochrome image corresponding to B, G and R image for exposure is caused to be displayed on a monochrome CRT for digital exposure. An exposure lens is located in such a manner that a monochrome image displayed on a monochrome CRT for digital exposure is image-formed on a silver halide color negative photographic paper positioned on a printing mask. Aforesaid monochrome image is converted to analogue signals in an order of B, G and R, and in synchronizing the timing of displaying a monochrome image corresponding to B, G and R digital exposure image onto a monochrome CRT for digital exposure, B, G and R filters of the filter wheel provided in the vicinity of an exposure path of an exposure lens are caused to be rotated. Thus, in an order of B, G and R, an image is subjected to digital exposure onto a silver halide color negative photographic paper.

EFFECTS OF THE INVENTION

The first effect of the present invention is that it is easy to obtain appropriate conversion information and it is also easy to cope with the fluctuation of exposure levels of digital exposures by an image outputting means, fluctuation of development level and dispersion of the characteristics of a light-sensitive material between each lot.

The second effect of the present invention is to be able to prevent the occurrence of abnormal color prints having colors different from the intrinsic colors due to overstressing saturation by means of developing effect among photosensitive layers by correcting influence by developing effect among photosensitive layers so that it is easy to obtain a color print having natural feeling.

The third effect of the present invention is that it is easy to obtain favorable prints.

The fourth effect of the present invention is that, even when a print is a synthesized image composed of a pattern image and a photographic image, it is easy to obtain a print in which the pattern image is recorded as a sharp image which can be distinguished favorably with the photographic image.

What is claimed is:

1. A method of producing converting data, comprising steps of:
   obtaining a first characteristic curve showing relationship between density value and exposure amount by forming images on a first photographic material with plural different amounts of exposure and by measuring density values of the formed images;
   determining digital exposure amount data so as to represent the exposure amount of the first characteristic curve;
   modifying the first characteristic curve so as to show relationship between the density value and the digital exposure amount data by changing the exposure amount to the digital exposure amount data;
   obtaining a second characteristic curve showing relationship between density value and digital input value for exposing means by forming images on a second photographic material by the exposure means based on plural different digital input values and by measuring density values of the formed images; and
   obtaining converting data to convert the digital exposure amount data into the digital input value based on the first characteristic curve and the second characteristic curve.

2. The method of claim 1, wherein the first photographic material and the second photographic material are the same kind photographic material.

3. The method of claim 1, wherein a density value change for a exposure amount change on a low density section of the second characteristic curve is a specific value.

4. The method of claim 1, wherein the converting data has a range of the digital exposure amount data to cover an exposure amount range from a minimum exposure amount to a maximum exposure amount.

5. The method of claim 4, wherein the minimum exposure amount is obtained by adding a predetermined amount to the exposure amount corresponding to the lowest density on the first characteristic curve.

6. The method of claim 4, wherein the maximum exposure amount is obtained by subtracting a predetermined amount from the exposure amount corresponding to the highest density on the first characteristic curve.

7. The method of claim 1, wherein the first characteristic curve and the second characteristic curve are obtained for each of blue, green and red colors and the converting data are prepared for each of blue, green and red colors.

8. A method of recording an image, comprising steps of:
   obtaining a first characteristic curve showing relationship between density value and exposure amount by forming images on a first photographic material with plural different amounts of exposure and by measuring density values of the formed images;
   determining digital exposure amount data so as to represent the exposure amount of the first characteristic curve;
   modifying the first characteristic curve so as to show relationship between the density value and the digital exposure amount data by changing the exposure amount to the digital exposure amount data;
   obtaining a second characteristic curve showing relationship between density value and digital input value for exposing means by forming images on a second photographic material by the exposure means based on plural different digital input values and by measuring density values of the formed images;
   obtaining converting data to convert the digital exposure amount data into the digital input value based on the first characteristic curve and the second characteristic curve;
   converting digital exposure amount data of an image into digital input value; and
   inputting the digital input value into the exposing means so as to record the image on a photographic material.

9. The method of claim 8, wherein the image is recorded with an exposure amount which is 2.0 to 2.7 times larger than an exposure amount corresponding to a density level in a density level range recordable on the photographic material.

10. The method of claim 8, wherein the exposure means is adapted to expose plural kinds of photographic materials and the converting data to convert the digital exposure amount data into the digital input value are prepared for each of the plural kinds of photographic materials.

11. The method of claim 10, wherein the plural kinds of photographic materials includes a color photographic film for photographing and a color photographic paper.

12. The method of claim 9, further comprising receiving image signals of the image and converting the image signals into the digital exposure amount data.

13. The method of claim 12, wherein the image signals represent density levels of the image.

14. The method of claim 12, wherein the image signals are contrast converting information.

15. The method of claim 12, wherein the digital exposure amount data are outputted for each of blue, green and red colors and the image signals are chroma converting information.

* * * * *

UNITED STATES PATENT AND TRADEMARK OFFICE
CERTIFICATE OF CORRECTION

PATENT NO.    : 5,966,505
DATED         : October 12, 1999
INVENTOR(S)   : Takashi Igarashi et al.

It is certified that error appears in the above-identified patent and that said Letters Patent is hereby corrected as shown below:

<u>Title page,</u>
U.S. PATENT DOCUMENTS, insert -- 4,979,032    12/1990    Alessi et al
                                  5,329,383    7/1994     Collette
                                  5,432,580    7/1995     Tokuda --.

Signed and Sealed this

Twelfth Day of November, 2002

Attest:

Attesting Officer

JAMES E. ROGAN
*Director of the United States Patent and Trademark Office*